(12) United States Patent
Hirokane et al.

(10) Patent No.: US 6,534,162 B1
(45) Date of Patent: Mar. 18, 2003

(54) MAGNETO-OPTICAL RECORDING MEDIUM

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 110 days.

(21) Appl. No.: 09/606,201

(22) Filed: Jun. 29, 2000

(30) Foreign Application Priority Data

Jun. 29, 1999 (JP) .......................................... 11-182802

(51) Int. Cl.⁷ ........................................... G11B 11/105
(52) U.S. Cl. ................................ 428/212; 428/694 RE; 428/694 MM; 428/694 IS; 369/13.43; 369/13.45; 369/13.5
(58) Field of Search ................................ 428/611, 668, 428/64.3, 332, 336, 694 MC, 694 MM, 900, 212, 694 RE, 694 IS; 369/13, 13.42, 13.43, 13.45, 13.5

(56) References Cited

U.S. PATENT DOCUMENTS

| | | | |
|---|---|---|---|
| 5,498,485 A | | 3/1996 | Nakayama et al. .. 428/694 ML |
| 5,714,251 A | | 2/1998 | Ohta et al. .................. 428/332 |
| 5,738,765 A | | 4/1998 | Ohta et al. ............. 204/192.23 |
| 5,777,953 A | | 7/1998 | Hirokane et al. ............. 369/13 |
| 5,814,400 A | * | 9/1998 | Kirino et al. ................ 360/131 |
| 5,889,739 A | * | 3/1999 | Nishimura et al. ........... 368/13 |
| 5,939,187 A | | 8/1999 | Hirokane et al. ............ 428/332 |
| 6,027,825 A | * | 2/2000 | Shiratori et al. ..... 428/694 ML |
| 6,044,044 A | * | 3/2000 | Miyazaki et al. ............. 369/13 |
| 6,187,460 B1 | * | 2/2001 | Nishimura .................. 369/116 |

FOREIGN PATENT DOCUMENTS

| JP | 62-217445 A | * | 9/1987 |
|---|---|---|---|
| JP | 9180276 A | | 7/1997 |
| JP | 9320134 A | | 12/1997 |

OTHER PUBLICATIONS

English Translation of Nakajima et al. (JP 62–217445A).*
JPO Abstract Translation of JP–62–217445 (Clipped Image JP362217445A).*

* cited by examiner

Primary Examiner—Stevan A. Resan
Assistant Examiner—Kevin M. Bernatz
(74) Attorney, Agent, or Firm—Birch, Stewart, Kolasch & Birch, LLP

(57) ABSTRACT

A magneto-optical recording medium includes at least: a reproducing magnetic layer composed at least of Gd and Co showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, the reproducing magnetic layer containing at least either Tb or Dy so as to increase the total magnetization at a temperature at which a perpendicular magnetic anisotropy constant and a diamagnetic field energy are equal to each other.

4 Claims, 19 Drawing Sheets

↑ TOTAL MAGNETIZATION

⇧ LEAKAGE FLUX

↑ TOTAL MAGNETIZATION

⇧ LEAKAGE FLUX

LEAKAGE FLUX

LEAKAGE FLUX

➡ TOTAL MAGNETIZATION

→ TM MOMENT

F I G. 1 4
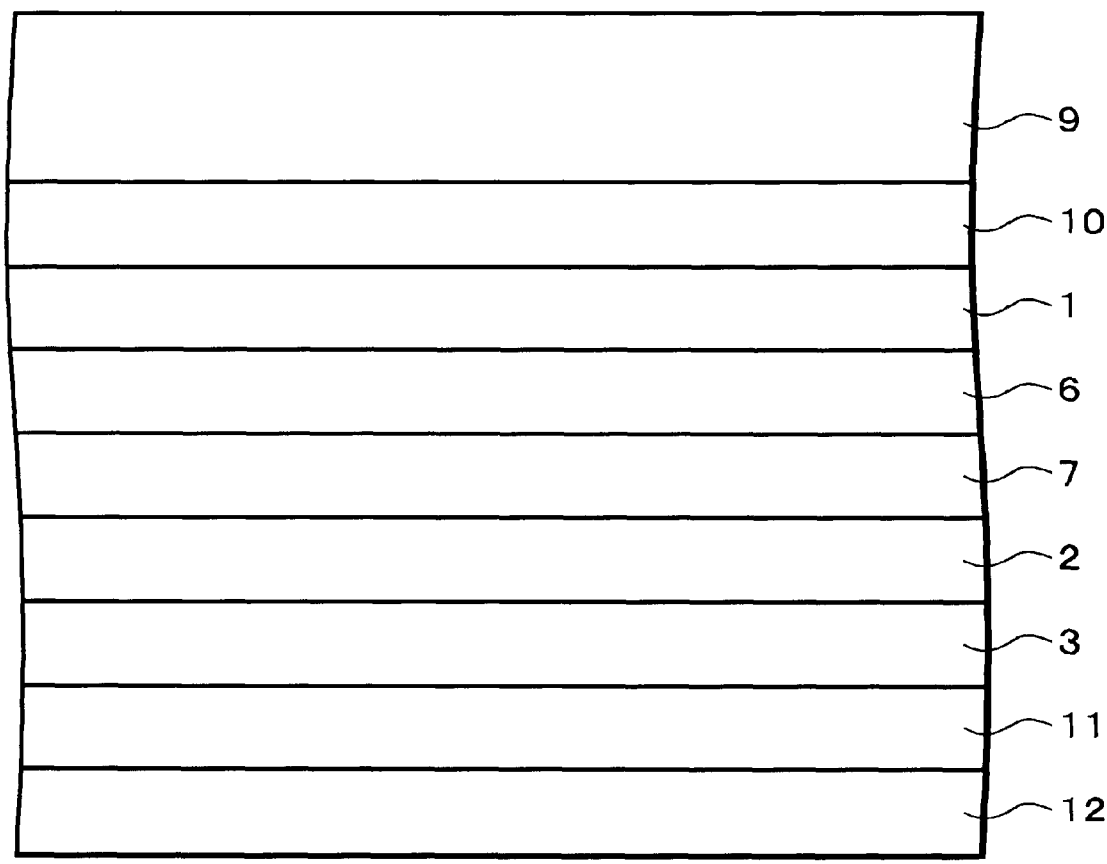

MAGNETO-OPTICAL RECORDING MEDIUM

FIELD OF THE INVENTION

The present invention relates to magneto-optical recording media, such as magneto-optical disks, magneto-optical tapes and magneto-optical cards, for use in magneto-optical recording and reproducing devices.

BACKGROUND OF THE INVENTION

Conventionally, a magneto-optical disk using a magneto-optical recording medium has been practically used as a rewritable optical recording medium. On such a magneto-optical disk, recording and erasure are performed by converging a light beam emitted by a semiconductor laser on the optical recording medium to raise a local temperature of the magneto-optical recording medium. The recorded information is reproduced by converging a light beam with such an intensity that recording and erasure are not effected on the magneto-optical recording medium and identifying the polarization state of the reflected light.

However, such a magneto-optical recording medium has a problem that the reproducing characteristics deteriorate as the recorded bit diameter of a recorded magnetic domain and the distance between the recorded bits decrease with respect to the beam spot diameter of the light beam. This problem is caused by the entry of adjacent recorded bit into the beam spot of the light beam converged on a target recorded bit, which prevents separate reproduction of individual recorded bits.

In order to solve the above problem, there has been a proposed magneto-optical recording medium including a reproducing magnetic layer which shows an in-plane magnetization state at room temperature and a perpendicular magnetization state at temperatures of not lower than a critical temperature, a non-magnetic intermediate layer, and a recording magnetic layer formed of a perpendicular magnetization film for recording information (Japanese laid-open patent application (Tokukaihei) No. 9-180276 (published date: Jul. 11, 1997)(USPN 5,777,953)). Moreover, in order to improve the reproducing characteristics of the magneto-optical recording medium, there has been a proposed magneto-optical recording medium including a reproducing magnetic layer which shows an in-plane magnetization state at room temperature and a perpendicular magnetization state at temperatures of not lower than a critical temperature, an in-plane magnetization layer having its Curie temperature in the vicinity of the critical temperature, a non-magnetic intermediate layer, and a recording magnetic layer formed of a perpendicular magnetization film for recording information (Japanese laid-open patent application (Tokukaihei) No. 9-320134 (published date: Dec. 12, 1997) (U.S. Pat. No. 5,939,187)).

In these magneto-optical recording media, since the reproducing magnetic layer shows an in-plane magnetization state within a temperature range below the critical temperature, the recorded magnetic domain information recorded on the recording magnetic layer is not copied to the reproducing magnetic layer, and thus the recorded magnetic domain information is not reproduced. In contrast, within a temperature range of not lower than the critical temperature, the reproducing magnetic layer shows a perpendicular magnetization state, the recorded magnetic domain information recorded in the recording magnetic layer is copied to the reproducing magnetic layer, and the recorded magnetic domain information is reproduced. Therefore, even when adjacent recorded bit enters into the beam spot of the light beam converged on the reproducing magnetic layer, if the reproducing power of the light beam and the critical temperature at which the reproducing magnetic layer changes into a perpendicular magnetization state are set suitably, the individual recorded bits can be reproduced separately, thereby allowing reproduction of information recorded at high density.

In recent years, however, there has been demand for optical disks with a larger recording capacity. Accordingly, it is required to form a smaller recorded magnetic domain in the recording magnetic layer, copy the recorded magnetic domain to the reproducing magnetic layer, and reproduce the recorded magnetic domain in a stable manner. In the magneto-optical disks disclosed in the above-mentioned publications Nos. 9-180276 and 9-320134, GdFeCo that is used as the reproducing magnetic layer has small perpendicular magnetic anisotropy, and the total magnetization of the reproducing magnetic layer becomes very small and the reproducing power margin becomes narrower with a rise in temperature. Thus, there has been a problem that it is impossible to copy a smaller recorded magnetic domain to the reproducing magnetic layer and reproduce the smaller recorded magnetic domain in a stable manner.

SUMMARY OF THE INVENTION

An object of the present invention is to provide a magneto-optical recording medium with a wide reproducing power margin.

In order to achieve the above object, a magneto-optical recording medium of the present invention includes at least: a reproducing magnetic layer composed at least of Gd and Co showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and is characterized in that the reproducing magnetic layer contains at least either Tb or Dy so as to increase the total magnetization at a temperature at which a perpendicular magnetic anisotropy constant and a diamagnetic field energy are equal to each other.

According to this structure, since either a rare-earth metal Tb or Dy capable of increasing the perpendicular magnetic anisotropy constant Ku is contained as the reproducing magnetic layer, it is possible to obtain a greater perpendicular magnetic anisotropy constant Ku compared with GdFeCo. Therefore, even when the total magnetization Ms within a temperature range within which the reproducing magnetic layer shows a perpendicular magnetization state is relatively large, it is possible to bring the reproducing magnetic layer into the perpendicular magnetization state.

Thus, during the copying and reproduction of the magnetization information of the recording magnetic layer onto the reproducing magnetic layer by magnetostatic coupling, the total magnetization Ms of the reproducing magnetic layer in a temperature region where the reproducing magnetic layer shows the perpendicular magnetization state with an increase of temperature is sufficiently large, and magnetostatic coupling forces between the reproducing magnetic layer and the recording magnetic layer are sufficiently strengthen. As a result, the magnetization information of the recording magnetic layer can be copied to the reproducing magnetic layer in a stable manner. Moreover, even when the temperature of the reproducing magnetic layer is further raised by an increase of the reproducing power, since the decrease of the total magnetization of the reproducing magnetic layer is relatively small, magnetostatic coupling forces necessary for copying and reproduction can be obtained, thereby providing a wide reproducing power margin.

For a fuller understanding of the nature and advantages of the invention, reference should be made to the ensuing detailed description taken in conjunction with the accompanying drawings.

BRIEF DESCRIPTION OF THE DRAWINGS

FIG. 14 is an explanatory view explaining a schematic structure of a magneto-optical disk as still another example of a magneto-optical recording medium according to the present invention.

DESCRIPTION OF THE PREFERRED EMBODIMENTS

[Embodiment 1]

The following description will explain an embodiment of the present invention with reference to the drawings.

Figure 1:
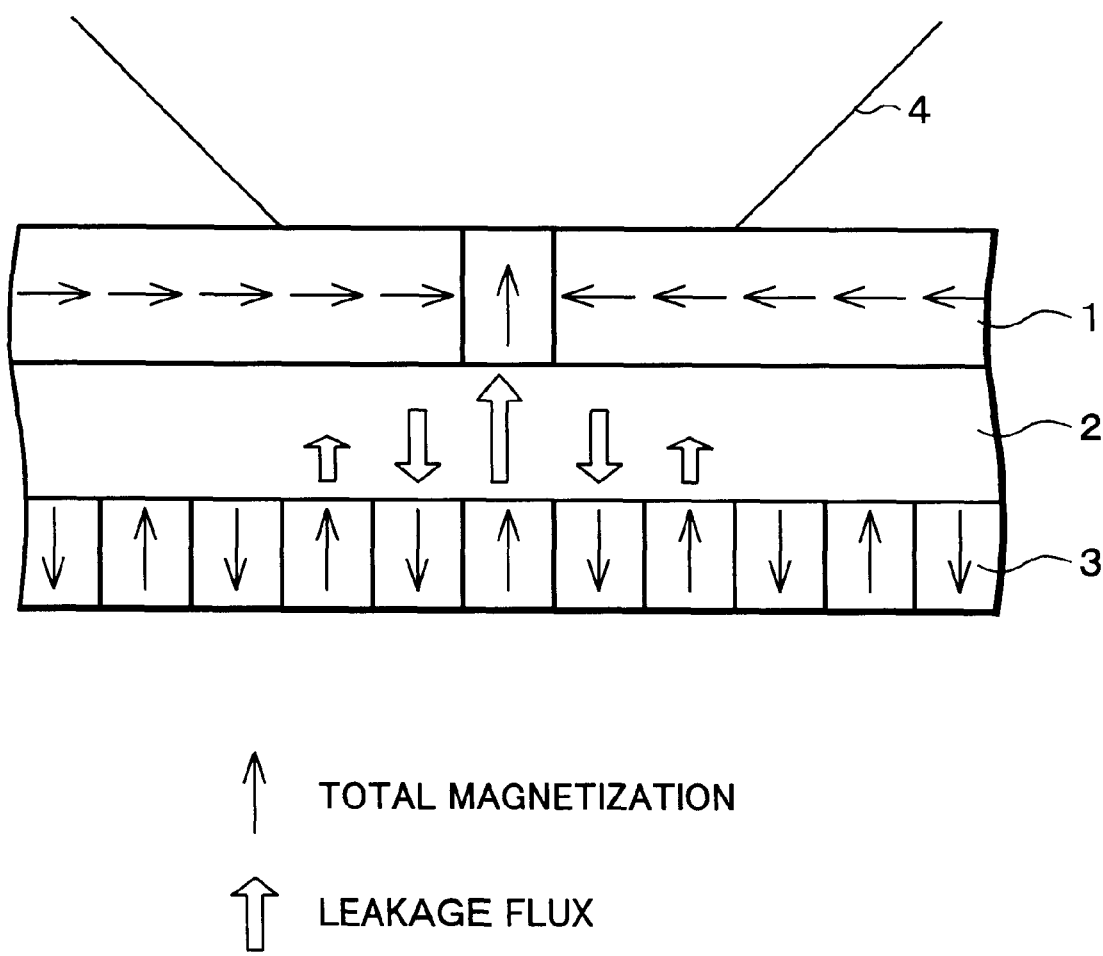
FIG. 1 is an explanatory view explaining the theory of a super resolution reproducing operation with respect to a magneto-optical recording medium according to one embodiment of the present invention.
Figure 2:
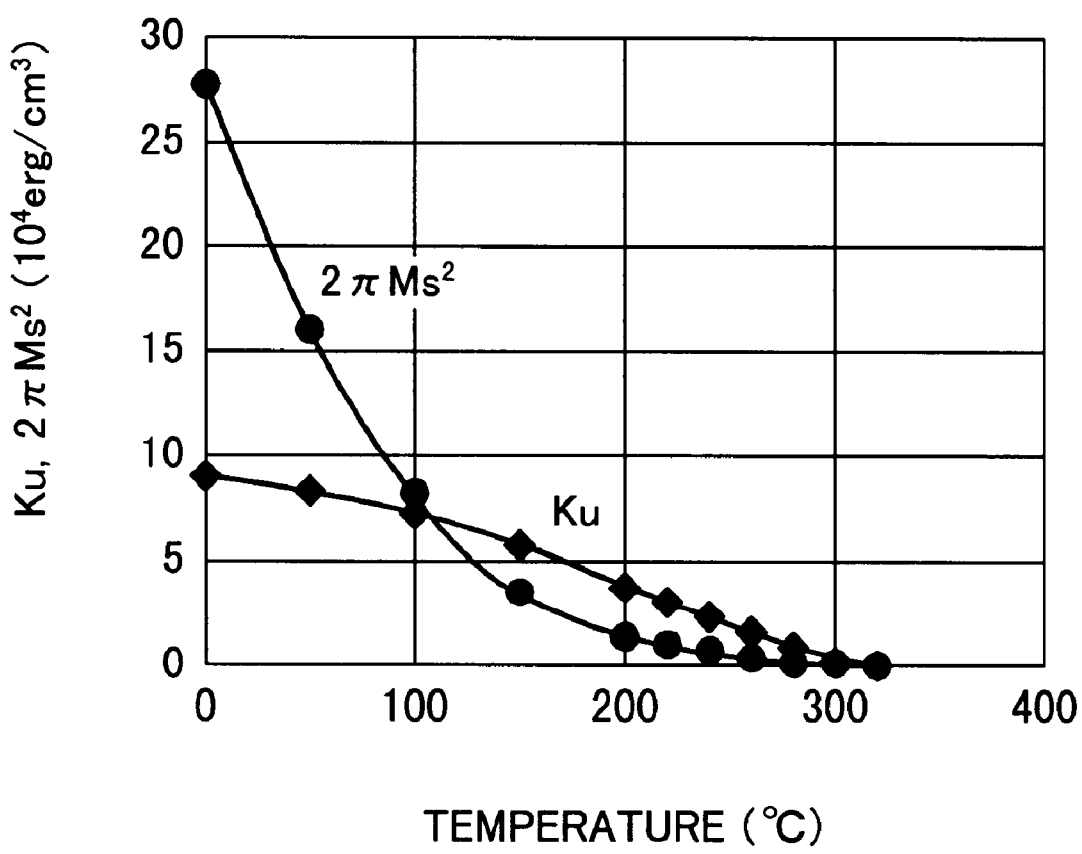
FIG. 2 is a graph showing the magnetic properties of a conventional reproducing magnetic layer.

First, the theory of a reproducing operation with respect to a magneto-optical recording medium according to this embodiment will be explained. FIG. 1 is an explanatory view explaining the theory of a super resolution reproducing operation with respect to the magneto-optical recording medium of this embodiment of the present invention, and FIG. 2 is an explanatory view explaining the theory of a conventional super resolution reproducing operation.

As illustrated in FIG. 1, a super resolution magneto-optical recording medium of this embodiment includes a reproducing magnetic layer 1, a non-magnetic intermediate layer 2 and a recording magnetic layer 3 arranged in this order. The reproducing magnetic layer 1 is formed of an alloy of a rare-earth metal and a transition metal showing an in-plane magnetization state at room temperature and a perpendicular magnetization state at temperatures of not lower than a critical temperature. The recording magnetic layer 3 is formed of an alloy of a rare-earth metal and a transition metal, which has a compensation temperature at room temperature.

Reproduction is carried out by converging and irradiating a light beam 4 from the reproducing magnetic layer 1 side. When the light beam 4 is irradiated, a Gaussian temperature distribution corresponding to the intensity distribution of the light beam 4 is formed on the medium. The reproducing magnetic layer 1 gradually changes from an in-plane magnetization state into a perpendicular magnetization state according to the temperature distribution, and shows the perpendicular magnetization state at temperatures of not lower than a certain critical temperature. Only the magnetization information of the recording magnetic layer 3 in a region where the temperature has been raised by the irradiation of the light beam 4 can be copied to the reproducing magnetic layer 1 by magnetostatic coupling, and reproduced by the light beam 4.

Here, in order to achieve optimum magnetostatic coupling, the composition of the recording magnetic layer 3 is adjusted so that the total magnetization increases with a rise in temperature and large leakage flux is produced in a region where the temperature has been raised. For the recording magnetic layer 3, a iperpendicular magnetization film having its compensation temperature in the vicinity of room temperature is used. Besides, the non-magnetic intermediate layer 2 is provided for the purpose of achieving stable magnetostatic coupling between the recording magnetic layer 3 and the reproducing magnetic layer 1. As described above, during the reproduction from this magneto-optical recording medium, it is desirable that the magnetization information of the recording magnetic layer 3 is copied to the reproducing magnetic layer 1 and reproduced in a stable manner within a temperature range of not lower than the critical temperature within which the reproducing magnetic layer 1 shows a perpendicular magnetization state.

FIG. 2 is a graph showing the temperature dependence of perpendicular magnetic anisotropy constant Ku and diamagnetic field energy $2\pi Ms^2$ of $Gd_{0.30}(Fe_{0.70}CO_{0.30})_{0.70}$ which has been conventionally used as the reproducing magnetic layer 1. The compensation temperature of the reproducing magnetic layer 1 formed of $Gd_{0.30}(Fe_{0.70}Co_{0.30})_{0.70}$ was 280° C., and the Curie temperature thereof was 320° C.

In order to make a magnetic thin film a perpendicular magnetization film, it is necessary to satisfy the condition $Ku>2\pi Ms^2$. Thus, it will be appreciated from FIG. 2 that the reproducing magnetic layer 1 formed of $Gd_{0.30}(Fe_{0.70}Co_{0.30})_{0.70}$ shows an in-plane magnetization state within a temperature range below 110° C. and a perpendicular magnetization state within a temperature range of not lower than 110° C. Since the perpendicular magnetic anisotropy constant Ku of GdFeCo is small, it is necessary to retain a low diamagnetic field energy within the temperature range for a perpendicular magnetization state. Thus, the total magnetization Ms within a temperature range within which the reproducing magnetic layer 1 formed of GdFeCo shows a perpendicular magnetization state is inevitably small. For instance, in FIG. 2, at 200° C. at which the reproducing magnetic layer 1 shows a perpendicular magnetization state, the total magnetization Ms of the reproducing magnetic layer 1 formed of GdFeCo is 40 emu/cc.

As illustrated in FIG. 1, in the super resolution magneto-optical recording medium of this embodiment, the magnetization information of the recording magnetic layer 3 is copied to the reproducing magnetic layer 1 and reproduced by magnetostatic coupling of the leakage flux produced from the recording magnetic layer 3 and the total magnetization of the reproducing magnetic layer 1 in a temperature region showing a perpendicular magnetization state with a rise in temperature. Therefore, if the total magnetization of the reproducing magnetic layer 1 in the temperature region showing a perpendicular magnetization state with a rise in temperature is reduced, magnetostatic coupling forces become weaker, and the magnetization information of the recording magnetic layer 3 can not be copied to the reproducing magnetic layer 1 in a stable manner. Moreover, when the temperature of the reproducing magnetic layer 1 is further raised by an increase of the reproducing power, it comes closer to the compensation temperature, the total magnetization of the reproducing magnetic layer 1 is further reduced, the magnetic coupling forces are further weaken, and thus the reproducing power margin becomes narrower.

Figure 3:
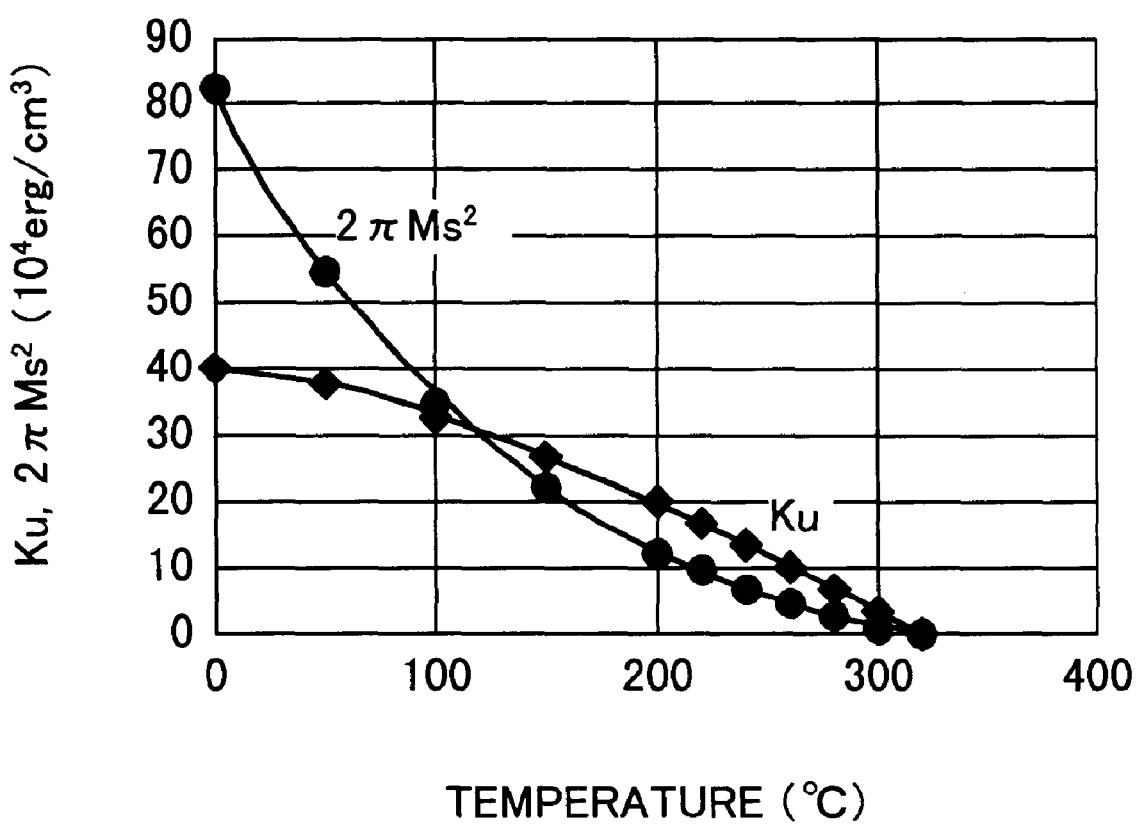
FIG. 3 is a graph showing the magnetic properties of a GdTbFeCo reproducing magnetic layer of the embodiment.

Therefore, in this embodiment, a GdTbFeCo reproducing magnetic layer containing Tb is used as the reproducing magnetic layer 1. FIG. 3 is a graph showing the temperature dependence of perpendicular magnetic anisotropy constant Ku and diamagnetic field energy $2\pi Ms^2$ of the GdTbFeCo reproducing magnetic layer 3 used in the magneto-optical recording medium of the embodiment. Here, the magnetic properties of the reproducing magnetic layer 1 formed of $(Gd_{0.90}Tb_{0.10})_{0.38}(Fe_{0.50}Co_{0.50})_{0.62}$ as typical GdTbFeCo are shown. Like GdFeCo, in order to make GdTbFeCo a perpendicular magnetization film, it is necessary to satisfy the condition $Ku>2\pi Ms^2$. Thus, it will be appreciated from FIG. 3 that, like FIG. 2, the reproducing magnetic layer 1 formed of $(Gd_{0.90}Tb_{0.10})_{0.38}(Fe_{0.50}Co_{0.50})_{0.62}$ shows an in-plane magnetization state within a temperature range below 110° C. and a perpendicular magnetization state within a temperature range of not lower than 110° C.

Since GdTbFeCo contains a rare-earth metal (Tb) capable of increasing the perpendicular magnetic anisotropy constant Ku, it can have a greater perpendicular magnetic anisotropy constant Ku than GdFeCo. Hence, even when the total magnetization Ms within a temperature range within which the reproducing magnetic layer 1 formed of GdTbFeCo shows a perpendicular magnetization state is relatively large, it is possible to bring the reproducing magnetic layer 1 into a perpendicular magnetization state.

For instance, in FIG. 3, at 200° C. at which the reproducing magnetic layer 1 formed of GdTbFeCo shows a perpendicular magnetization state, the total magnetization Ms of the reproducing magnetic layer 1 formed of GdTbFeCo is 144 emu/cc. It is thus possible to realize a total magnetization Ms 3.6 times larger than the total magnetization Ms of the reproducing magnetic layer 1 formed of GdFeCo shown in FIG. 2.

For this reason, during the copying and reproduction of the magnetization information of the recording magnetic layer 3 onto the reproducing magnetic layer 1 by magnetostatic coupling, the total magnetization Ms of the reproducing magnetic layer 1 in a temperature region showing a perpendicular magnetization state with a rise in temperature is sufficiently large, and the magnetostatic coupling forces between the reproducing magnetic layer 1 and the recording magnetic layer 3 are sufficiently strong. As a result, the magnetization information of the recording magnetic layer 3 can be copied to the reproducing magnetic layer 1 in a stable manner. Moreover, even when the temperature of the reproducing magnetic layer 1 is further raised by an increase of the reproducing power, the reduction of the total magnetization of the reproducing magnetic layer 1 is relatively small and magnetostatic coupling forces necessary for the copying and reproduction can be obtained, and thus a wide reproducing power margin is provided.

Figure 4:
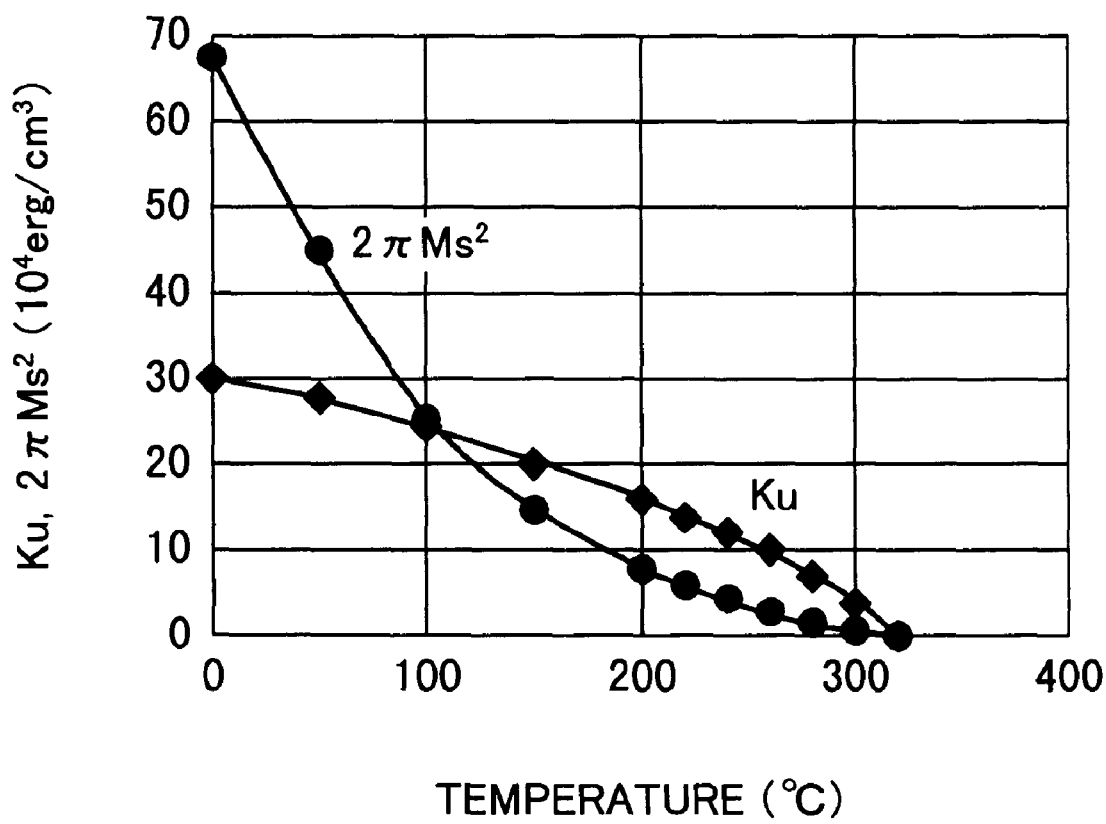
FIG. 4 is a graph showing the magnetic properties of a GdDyFeCo reproducing magnetic layer of the embodiment.

FIG. 4 shows the temperature dependence of perpendicular magnetic anisotropy constant Ku and diamagnetic field energy $2\pi Ms^2$ of the GdDyFeCo reproducing magnetic layer 1 used in the magneto-optical recording medium of this embodiment. Here, the magnetic properties of the reproducing magnetic layer 1 formed of $(Gd_{0.84}Dy_{0.16})_{0.33}(Fe_{0.50}Co_{0.50})_{0.67}$ as typical GdDyFeCo are shown. Like GdFeCo, in order to make GdDyFeCo a perpendicular magnetization film, it is necessary to satisfy the condition $Ku>2\pi Ms^2$. Thus, it will be appreciated from FIG. 4 that the reproducing magnetic layer 1 formed of $(Gd_{0.84}Dy_{0.01})_{0.33}(Fe_{0.50}Co_{0.50})_{0.67}$ shows an in-plane magnetization state within a temperature range below 105° C. and a perpendicular magnetization state within a temperature range of not lower than 105° C.

Since GdDyFeCo contains a rare-earth metal (Dy) capable of increasing the perpendicular magnetic anisotropy constant Ku, it can realize a greater perpendicular magnetic anisotropy constant Ku than GdFeCo. Hence, even when the total magnetization Ms within a temperature range within which the reproducing magnetic layer 1 formed of GdDyFeCo shows a perpendicular magnetization state is relatively large, it is possible to bring the reproducing magnetic layer 1 into a perpendicular magnetization state.

For instance, in FIG. 4, at 200° C. at which the reproducing magnetic layer 1 formed of GdDyFeCo shows a perpendicular magnetization state, the total magnetization Ms of the reproducing magnetic layer 1 formed of GdDy- FeCo is 113 emu/cc. It is thus possible to realize a total magnetization Ms 2.8 times larger than the total magnetization Ms of the reproducing magnetic layer 1 formed of GdFeCo shown in FIG. 2.

For this reason, during the copying and reproduction of the magnetization information of the recording magnetic layer 3 onto the reproducing magnetic layer 1 by magnetostatic coupling, the total magnetization Ms of the reproducing magnetic layer 1 in a temperature region showing a perpendicular magnetization state with a rise in temperature is sufficiently large, and the magnetostatic coupling forces between the reproducing magnetic layer 1 and the recording magnetic layer 3 are sufficiently strong. As a result, the magnetization information of the recording magnetic layer 3 can be copied to the reproducing magnetic layer 1 in a stable manner. Moreover, even when the temperature of the reproducing magnetic layer 1 is further raised by an increase of the reproducing power, the reduction of the total magnetization of the reproducing magnetic layer 1 is relatively small and magnetostatic coupling forces necessary for the copying and reproduction can be obtained, and thus a wide reproducing power margin is provided.

Furthermore, as described later (in Example 10), even when the reproducing magnetic layer 1 is formed of GdTbCo, the same effects can be obtained.

As described above, in the magneto-optical recording medium of this embodiment, by arranging the reproduction magnetic layer 1 to contain either Tb or Dy, the total magnetization at a temperature at which the perpendicular magnetic anisotropy constant and diamagnetic energy of the reproducing magnetic layer 1 are equal to each other is increased in comparison with a GdFeCo reproducing magnetic layer whose perpendicular magnetic anisotropy constant and diamagnetic energy are equal at that temperature. This arrangement can achieve a satisfactory reproducing power margin. In addition, the Curie temperature of the reproducing magnetic layer can be made higher and the Kerr rotation angle of the reproducing magnetic layer can be increased so as to improve the quality of reproduced signals.

[Embodiment 2]

The following description will explain another embodiment of the present invention with reference to the drawings.

First, referring to FIG. 5, the theory of a super resolution reproducing operation with respect to a magneto-optical recording medium according to this embodiment will be explained.

Figure 5:
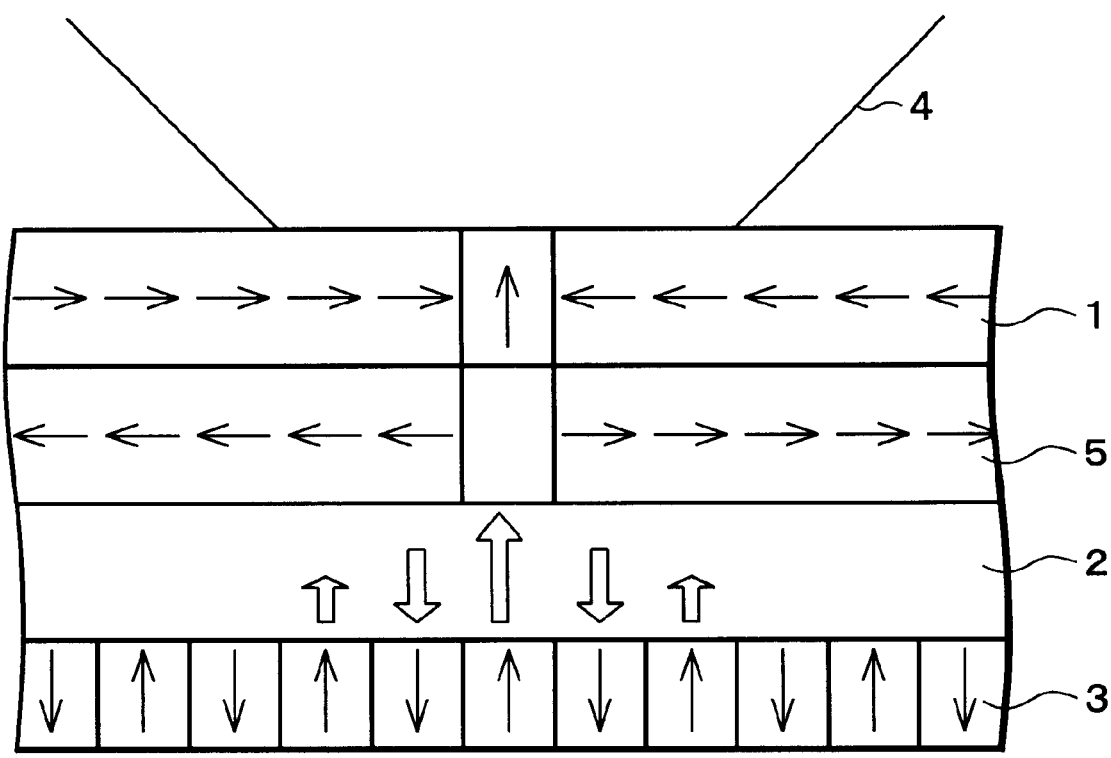
FIG. 5 is an explanatory view explaining the theory of super resolution reproduction with respect to a magneto-optical recording medium according to another embodiment of the present invention.

As illustrated in FIG. 5, a super resolution magneto-optical recording medium of this embodiment includes a reproducing magnetic layer 1, an in-plane magnetization layer 5, a non-magnetic intermediate layer 2 and a recording magnetic layer 3 arranged in this order. The reproducing magnetic layer 1 is formed of an alloy of a rare-earth metal and a transition metal showing an in-plane magnetization state at room temperature and a perpendicular magnetization state at temperatures of not lower than a critical temperature. The recording magnetic layer 3 is formed of an alloy of a rare-earth metal and a transition metal, which has a compensation temperature at room temperature. The in-plane magnetization layer 5 has its Curie temperature in the vicinity of the critical temperature.

Super resolution reproduction of this embodiment is basically the same as that of Embodiment 1 described above. More specifically, super resolution reproduction is realized by copying only the magnetization information of the recording magnetic layer 3 in a region where the reproducing magnetic layer 1 shows a perpendicular magnetization state to the reproducing magnetic layer 1 by magnetostatic coupling. In this embodiment, the in-plane magnetization layer 5 having its Curie temperature in the vicinity of the critical temperature is layered adjacent to the reproducing magnetic layer 1, and the reproducing magnetic layer 1 and in-plane magnetization layer 5 are exchange-coupled so as to strongly fix the magnetization of the reproducing magnetic layer 1 in an in-plane magnetization state within a temperature range within which the in-plane magnetization layer 5 is not higher than the Curie temperature. As a result, the reproducing magnetic layer 1 shows an abrupt transition from the in-plane magnetization state to the perpendicular magnetization state, thereby improving the reproduction resolution.

Here, when the direction of magnetization within the temperature range within which the reproducing magnetic layer 1 itself changes from an in-plane magnetization state to a perpendicular magnetization state is fixed to the in-plane magnetization state by exchange coupling with the in-plane magnetization state of the in-plane magnetization layer 5, it is possible to bring the reproducing magnetic layer 1 into a perpendicular magnetization state only within a temperature range of not lower than the Curie temperature of the in-plane magnetization layer 5. For this reason, it is desirable to set the Curie temperature of the in-plane magnetization layer 5 at a temperature at which the reproducing magnetic layer 1 itself changes from an in-plane magnetization state to a perpendicular magnetization state, i.e., at a temperature at which Ku and $2\pi Ms^2$ are almost equal to each other, or at a slightly higher temperature.

Here, when the reproducing magnetic layer formed of GdFeCo shown in FIG. 2 is used as the reproducing magnetic layer 1 of this embodiment and the Curie temperature of the in-plane magnetization layer 5 is set at 140° C., the magnetization of the reproducing magnetic layer 1 is fixed to the in-plane magnetization state by exchange coupling with the in-plane magnetization layer 5 within a temperature range within which the reproducing magnetic layer 1 formed of GdFeCo has a relatively large total magnetization, i.e., a temperature range of from 100° C. to 140° C. Therefore, the total magnetization Ms of the reproducing magnetic layer 1 formed of GdFeCo in a region where the reproducing magnetic layer 1 shows a perpendicular magnetization state is smaller compared with Embodiment 1, and the magnetostatic coupling forces between the reproducing magnetic layer 1 and the recording magnetic layer 3 are further weaken. For this reason, the magnetization information of the recording magnetic layer 3 can not be copied to the reproducing magnetic layer 1 in a stable manner. Furthermore, when the temperature of the reproducing magnetic layer 1 is further raised by an increase of the reproducing power, since the total magnetization of the reproducing magnetic layer 1 is further reduced, the magnetostatic coupling is further weaken and the reproducing power margin becomes narrower.

In this embodiment, therefore, like Embodiment 1 described above, the reproducing magnetic layer 1 is formed by using any one of GdTbFeCo, GdDyFeCo and GdTbCo shown in FIGS. 3 and 4, which are capable of increasing the total magnetization Ms within a temperature range within which the reproducing magnetic layer 1 shows a perpendicular magnetization state. As a result, since the magnetostatic coupling forces between the reproducing magnetic layer 1 and the recording m agnetic layer 3 are strengthen, it is possible to copy the magnetization information of the recording magnetic layer 3 to the reproducing magnetic layer 1 in a stable manner and provide a wide reproducing power margin.

[Embodiment 3]

The following description will explain another embodiment of the present invention with reference to the drawings.

First, referring to FIG. 6, the theory of a super resolution reproducing operation with respect to a magneto-optical recording medium according to this embodiment will be explained.

Figure 6:
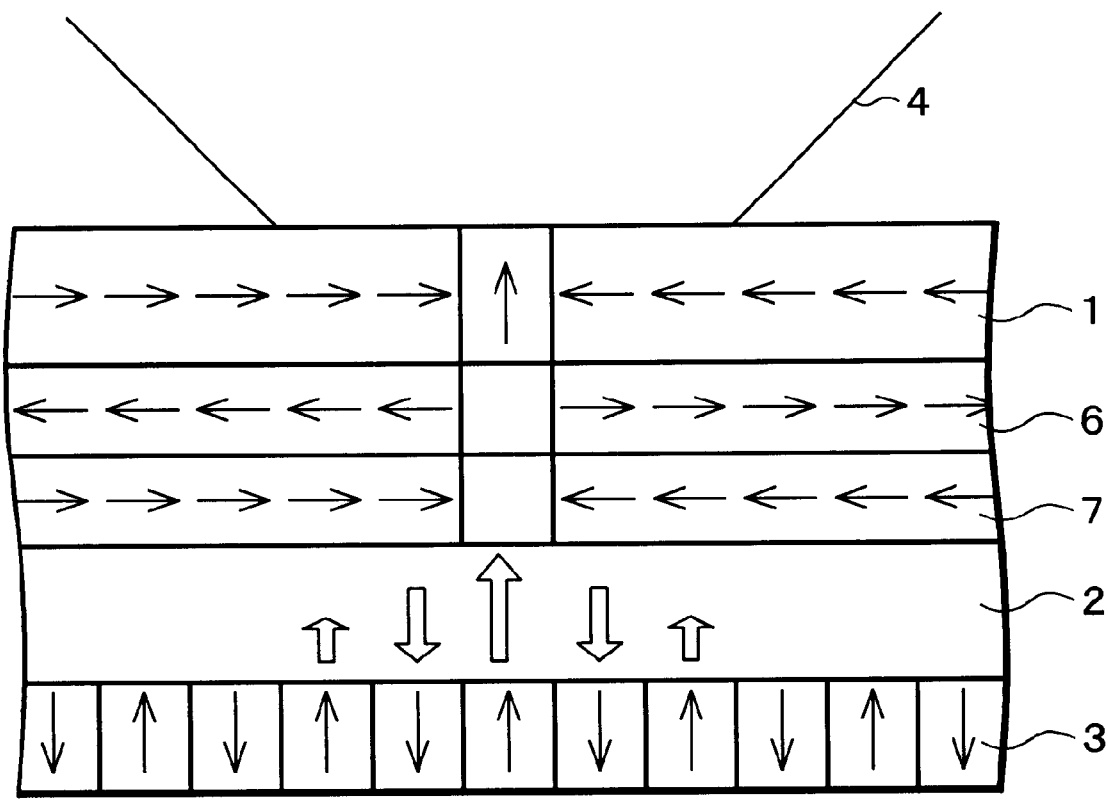
FIG. 6 is an explanatory view explaining the theory of super resolution reproduction with respect to a magneto-optical recording medium according to still another embodiment of the present invention.

As illustrated in FIG. 6, a super resolution magneto-optical recording medium of this embodiment includes a reproducing magnetic layer 1, a first in-plane magnetization layer 6, a second in-plane magnetization layer 7, a non-magnetic intermediate layer 2 and a recording magnetic layer 3 arranged in this order. The reproducing magnetic layer 1 is formed of an alloy of a rare-earth metal and a transition metal showing an in-plane magnetization state at room temperature and a perpendicular magnetization state at temperatures of not lower than a critical temperature. The recording magnetic layer 3 is formed of an alloy of a rare-earth metal and a transition metal, which has a compensation temperature at room temperature. The first in-plane magnetization layer 6 has its Curie temperature in the vicinity of the critical temperature. The second in-plane magnetization layer 7 has its Curie temperature in the vicinity of the critical temperature, and different magnetic properties from the first in-plane magnetization layer 6.

Super resolution reproduction of this embodiment is basically the same as that of Embodiment 1 described above. More specifically, super resolution reproduction is realized by copying only the magnetization information of the recording magnetic layer 3 in a region where the reproducing magnetic layer 1 shows a perpendicular magnetization state to the reproducing magnetic layer 1 by magnetostatic coupling. In this embodiment, the in-plane magnetization layers 6 and 7, which have their Curie temperature in the vicinity of the critical temperature and mutually different magnetic properties, are layered adjacent to the reproducing magnetic layer 1, and exchange coupling is effected between the reproducing magnetic layer 1 and the in-plane magnetization layers 6 and 7 to strongly fix the magnetization of the reproducing magnetic layer 1 to the in-plane magnetization state within a temperature range within which the in-plane magnetization layers 6 and 7 are not higher than their Curie temperature. Consequently, the reproducing magnetic layer 1 shows an abrupt transition from the in-plane magnetization state to the perpendicular magnetization state, thereby improving the reproduction resolution.

Referring now to FIG. 7(a) through FIG. 7(d), the structure of Embodiment 2 having only the in-plane magnetization layer 8 consisting of a single layer will be compared with the structure of this embodiment including the first in-plane magnetization layer 6 and second in-plane magnetization layer 7 of different magnetic polarities.

Figure 7:
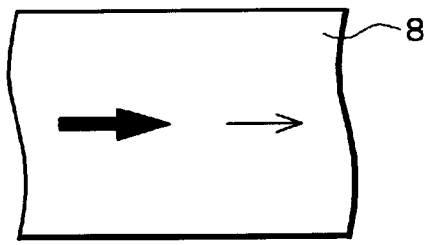
FIGS. 7(a) through 7(d) are explanatory views explaining the theory of reproduction with respect to a magneto-optical recording medium according to the embodiment.
Figure 7:
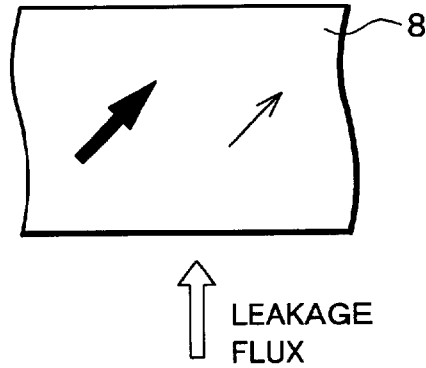
Figure 7:
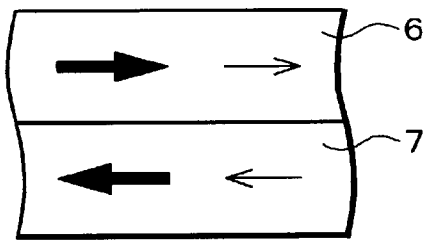
Figure 7:
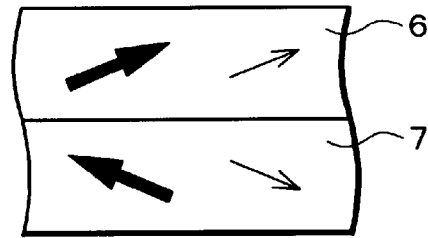

FIGS. 7(a) and 7(b) show the magnetization states of the in-plane magnetization layer 8 consisting of a single layer, and FIGS. 7(c) and 7(d) show the magnetization states when the first in-plane magnetization layer 6 and second in-plane magnetization layer 7 are exchange-coupled.

In the state shown in FIG. 7(a) in which leakage flux from the recording magnetic layer 3 is not present, the in-plane magnetization layer 8 consisting of a single layer is in a completely in-plane magnetization state. Here, the in-plane magnetization layer 8 is an in-plane magnetization film of a TM-rich composition, and the direction of the total magnetization and the direction of the TM moment are parallel with each other. Next, in the state shown in FIG. 7(b) in which leakage flux is present, forces for making the direction of the total magnetization parallel with the direction of the leakage flux are applied to the total magnetization by magnetostatic coupling between the total magnetization and leakage flux, and then the directions of the total magnetization and TM moment tilt with respect to the plane of the film.

On the other hand, when the first in-plane magnetization layer 6 of the TM-rich composition and the second in-plane magnetization layer 7 of a RE-rich composition are exchange-coupled, like the in-plane magnetization layer 8 consisting of a single layer, both of the first in-plane magnetization layer 6 and second in-plane magnetization layer 7 are in a completely in-plane magnetization state as the state shown in FIG. 7(c) in which the leakage flux is not present. Here, the first in-plane magnetization layer 6 is an in-plane magnetization film of a TM-rich composition, and the directions of the total magnetization and the TM moment are parallel with each other. The second in-plane magnetization layer 7 is an in-plane magnetization film of a RE-rich composition, and the directions of the total magnetization and the TM moment are antiparallel with each other. In addition, since exchange coupling forces act between the first in-plane magnetization layer 6 and second in-plane magnetization layer 7, the direction of the magnetization is set so as to make the directions of the TM moments of the respective layers parallel with each other.

Next, in FIG. 7(d) in which the leakage flux is present, the total magnetizations of the first in-plane magnetization layer 6 and second in-plane magnetization layer 7 are magnetostatically coupled with the leakage flux. As a result, forces for making the directions of the total magnetizations parallel with the direction of the leakage flux are applied to the total magnetizations. Here, since the magnetic polarities of the first in-plane magnetization layer 6 and second in-plane magnetization layer 7 are different from each other, the first in-plane magnetization layer 6 has an upward TM moment, while the second in-plane magnetization layer 7 has a downward TM moment. Consequently, a boundary magnetic wall is formed between the first in-plane magnetization layer 6 and the second in-plane magnetization layer 7, and magnetic wall energy produced by the formation of the boundary magnetic wall is stored. In this case, the magnetization state is determined so as to minimize the total energy of the energy produced by the magnetostatic coupling and the boundary magnetic wall energy. Hence, since the boundary magnetic wall energy is stored, the tilts of the total magnetizations and TM moments are made smaller compared with those of the in-plane magnetization layer 8 consisting of a single layer.

As described above, by forming a boundary magnetic wall by the exchange coupling of the in-plane magnetization layers having different polarities, it is possible to significantly strengthen forces for retaining the in-plane magnetization state against the leakage flux.

As described above, in the structure of this embodiment, since the first in-plane magnetization layer 6 and second in-plane magnetization layer 7 having stronger forces for retaining them in the in-plane magnetization state are layered on the reproducing magnetic layer 1, it is possible to achieve higher reproduction resolution compared with the structure of Embodiment 2.

Even in this embodiment, however, like Embodiment 2, if the direction of magnetization within a temperature range within which the reproducing magnetic layer 1 itself changes from an in-plane magnetization state to a perpendicular magnetization state is fixed to the in-plane magnetization state by exchange coupling with the in-plane magnetizations of the first in-plane magnetization layer 6 and second in-plane magnetization layer 7, the magnetization of the reproducing magnetic layer 1 is fixed to the in-plane magnetization state within a temperature range within which the total magnetization Ms is relatively large, i.e., a temperature range of from 100° C. to 140° C. Therefore, in a region where the GdFeCo reproducing magnetic layer 1 shows the perpendicular magnetization state, the total magnetization Ms of the reproducing magnetic layer 1 is further reduced in comparison with that of Embodiment 1, and the magnetostatic coupling forces between the reproducing magnetic layer 1 and the recording magnetic layer 3 are further weaken. Consequently, the magnetization information of the recording magnetic layer 3 can not be copied to the reproducing magnetic layer 1 in a stable manner. Moreover, when the reproducing power is increased and the temperature of the reproducing magnetic layer 1 is further raised, since the total magnetization of the reproducing magnetic layer 1 is further reduced, the magnetostatic coupling forces are further weaken and the reproduction margin becomes narrower.

Therefore, in this embodiment, like Embodiments 1 and 2 described above, the reproducing magnetic layer 1 is formed by using any one of GdTbFeCo, GdDyFeCo and GdTbCo shown in FIGS. 3 and 4, which are capable of increasing the total magnetization Ms within a temperature range within which the reproducing magnetic layer 1 shows the perpendicular magnetization state. As a result, since the magnetostatic coupling forces between the reproducing magnetic layer 1 and the recording magnetic layer 3 are strengthen, it is possible to copy the magnetization information of the recording magnetic layer 3 to the reproducing magnetic layer 1 in a stable manner and provide a wide reproducing power margin.

[Embodiment 4]

The following description will explain still another embodiment of the present invention with reference to the drawings.

In order to improve the quality of reproduced signals by increasing the polar Kerr rotation angle in a short wavelength range, an attempt to add Nd as a rare-earth metal to a GdFeCo reproducing magnetic layer has been conventionally made. However, when the amount of Nd added is increased, the Curie temperature of the reproducing magnetic layer is lowered and the polar Kerr rotation angle becomes substantially smaller.

In a magneto-optical recording medium in which the reproducing magnetic layer and the recording magnetic layer are exchange-coupled, even if the reproducing magnetic layer has a small perpendicular magnetic anistotropy constant Ku and is not made a completely perpendicular magnetization film, it is possible to bring the reproducing magnetic layer into a perpendicular magnetization state by the exchange coupling with the recording magnetic layer and compensate for a lowering of the Curie temperature due to the addition of Nd by relatively increasing the Co conent of GdNdFeCo having a relatively small perpendicular magnetic anisotropy constant Ku.

However, in a magneto-optical recording medium in which the reproducing magnetic layer 1 and the recording magnetic layer 3 are exchange-coupled as in the present invention, if the perpendicular magnetic anisotropy constant Ku of the reproducing magnetic layer 1 becomes smaller, it is impossible to achieve such a characteristic that a transition from an in-plane magnetization state to a perpendicular magnetization state occurs with a rise in temperature. Therefore, in the magneto-optical recording medium in which the reproducing magnetic layer 1 and the recording magnetic layer 3 are magneto-statically coupled as in the present invention, when the lowering of the Curie temperature due to the addition of Nd is compensated by relatively increasing the Co content of GdNdFeCo having a relatively small perpendicular magnetic anisotropy constant Ku, it is difficult to bring the reproducing magnetic layer 1 into a perpendicular magnetization state.

Therefore, in this embodiment, like Embodiments 1 through 3 described above, the reproducing magnetic layer 1 is formed by using any one of GdTbFeCoNd, GdDyFeCoNd and GdTbCoNd which contain a rare-earth metal consisting of Tb or Dy capable of increasing the perpendicular magnetic anisotropy constant Ku. With this structure, it is possible to ensure a sufficiently large perpendicular magnetic anisotropy constant, compensate for the lowering of the Curie temperature due to the addition of Nd by relatively increasing the Co content and increase the polar Kerr rotation angle in a short wavelength range, thereby improving the quality of reproduced signals.

Furthermore, the reproducing magnetic layer 1 of this embodiment is also applicable to any of the magneto-optical recording media of Embodiments 1 through 3 described above, and can provide the same effects by the structures similar to these embodiments.

The following description will explain examples of the present invention.

EXAMPLE 1

One example of the present invention will be explained below. In this example, an application of a magneto-optical recording medium to a magneto-optical disk will be explained.

Figure 8:
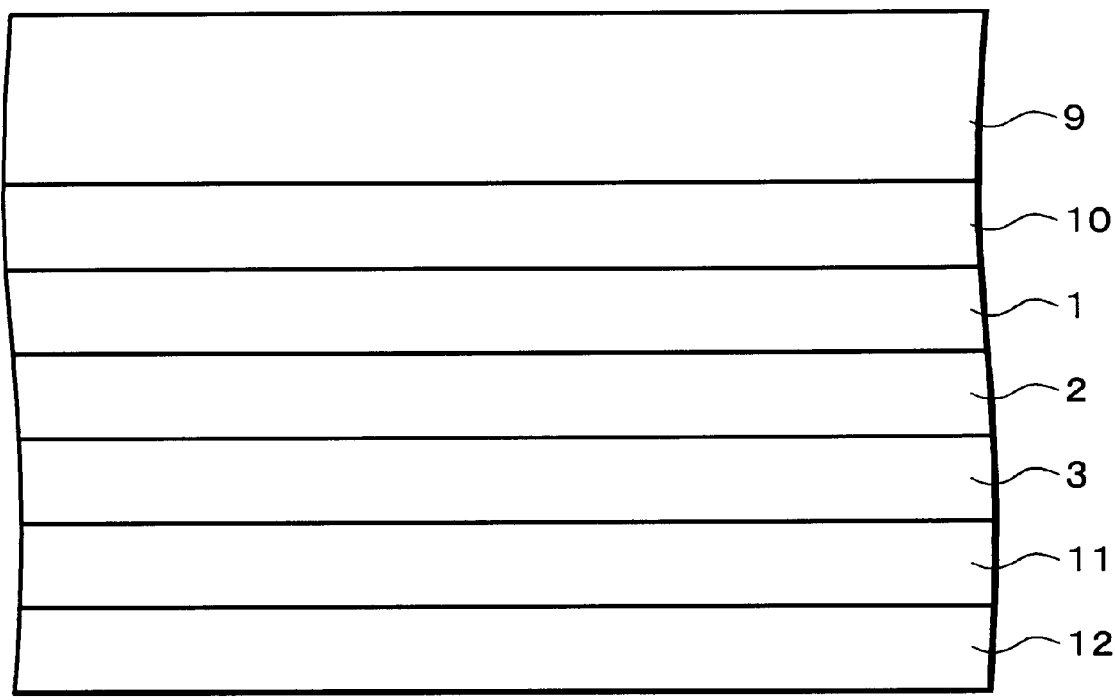
FIG. 8 is an explanatory view explaining a schematic structure of a magneto-optical disk as an example of a magneto-optical recording medium according to the present invention.

As illustrated in FIG. 8, the magneto-optical disk of this example includes a disk main body composed of a substrate 9, a transparent dielectric layer 10, a reproducing magnetic layer 1, non-magnetic intermediate layer 2, a recording magnetic layer 3 a protective layer 11 and an overcoat layer 12 arranged in this order.

As the recording method for such a magneto-optical disk, a Curie temperature recording method is used. Besides, information is reproduced by a magneto-optical effect known as the polar Kerr effect, and recording and reproduction are carried out by converging a light beam emitted from a semiconductor laser on the reproducing magnetic layer 1 by an objective lens. The above-mentioned polar Kerr effect is a phenomenon in which the direction of rotation of the plane of polarization of the reflected light is reversed by a magnetization direction perpendicular to the incident surface.

The substrate 9 is formed of, for example, a transparent substrate, such as polycarbonate, in the shape of a disk.

It is desirable that the transparent dielectric layer 10 is formed by a material containing no oxygen, such as AlN, SiN and AlSiN. Moreover, it is necessary to set the film thickness so as to provide a good interference effect against the incident laser light and increase the Kerr rotation angle of the medium. If the wavelength of reproducing laser light is denoted as λ and the refractive index of the transparent dielectric layer 8 is denoted as n, the film thickness of the transparent dielectric layer 8 is set around (λ/4n). For instance, if the wavelength of the laser light is 680 nm, the transparent dielectric layer 10 needs to have a film thickness ranging from around 40 nm to around 100 nm.

As the reproducing magnetic layer 1, a magnetic film formed of GdTbFeCo is used. The composition of the reproducing magnetic layer 1 is adjusted to have such magnetic properties that the reproducing magnetic layer 1 shows an in-plane magnetization state at room temperature and a perpendicular magnetization state at temperatures of not lower than a predetermined critical temperature with a rise in temperature.

It is desirable that the critical temperature of the reproducing magnetic layer 1 is not lower than 100° C., but not higher than 200° C. If the critical temperature is lower than 100° C., the reproducing magnetic layer 1 shows a perpendicular magnetization state as the temperature is slightly raised, and thus stable magnetic properties can not be obtained with respect to changes in environmental temperature. On the other hand, if the critical temperature is higher than 200° C., since the critical temperature and the Curie temperature of the recording magnetic layer 3 are close, it is difficult to ensure a reproducing laser power margin.

It is desirable that the film thickness of the reproducing magnetic layer 1 is not less than 10 nm but not more than 80 nm. If the film thickness of the reproducing magnetic layer 1 is less than 10 nm, the reflected light from the reproducing magnetic layer 1 is reduced, the intensity of a reproduced signal is noticeably lowered, and the reproduction resolution deteriorates as the light beam 4 passed through the reproducing magnetic layer 1 reproduces the magnetization information of the recording magnetic layer 3. On the other hand, if the film thickness is more than 80 nm, the recording sensitivity deteriorates notably due to the increase in the film thickness.

The non-magnetic intermediate layer 2 is formed by a dielectric material, such as AlN, SiN and AlSiN, a non-magnetic metal, such as Al, Ti and Ta, or an alloy thereof. In order to achieve magnetostatic coupling between the reproducing magnetic layer 1 and the recording magnetic layer 3 the film thickness of the non-magnetic intermediate layer 2 is set within a range of from 0.5 nm to 60 nm. If the film thickness of the non-magnetic intermediate layer 2 is less than 0.5 nm, the non-magnetic intermediate layer 2 is not formed continuously, and therefore stable magnetostatic coupling can not be retained. On the other hand, if the film thickness of the non-magnetic intermediate layer 2 is more than 60 nm, since the distance between the recording magnetic layer 3 and the reproducing magnetic layer 1 increases, stable magnetostatic coupling can not be retained.

The recording magnetic layer 3 is formed of a perpendicular magnetization film formed by a rare-earth and transition metal alloy having a compensation temperature in the vicinity of room temperature, and its film thickness is set within a range of from 20 nm to 80 nm. If the film thickness of the recording magnetic layer 3 is less than 20 nm, leakage flux produced from the recording magnetic layer 3 becomes smaller, and therefore stable magnetostatic coupling can not be retained. On the other hand, if the film thickness of the recording magnetic layer 3 is more than 80 nm, the recording sensitivity deteriorates notably due to the increase in the film thickness.

The protective layer 11 is formed by a dielectric material, such as AlN, SiN and AlSiN, or an alloy of non-magnetic metals, such as Al, Ti and Ta. The protective film 11 is provided to prevent the oxidation of the rare-earth and transition metal alloys used for the reproducing magnetic layer 1 and recording magnetic layer 3. The film thickness of the protective layer 11 is set within a range of from 5 nm to 60 nm.

The overcoat layer 12 is formed by applying onto the protective layer 11 an ultraviolet-ray-hardening resin or a thermosetting resin by spincoating and by applying ultraviolet rays or heat.

Next, the following description will explain examples of the fabrication method of a magneto-optical disk having this structure and the recording and reproducing characteristics.

(1) Fabrication Method of Magneto-Optical Disk

The fabrication method of a magneto-optical disk with this structure will be explained.

First, a disk-shaped polycarbonate substrate 9 with 0.6 μm-wide land recording region and groove recording region provided in a spiral form to achieve land and groove recording was placed in a substrate holder in a sputtering device provided with an Al target, a GdTbFeCo alloy target and a TbFeCo alloy target. After evacuating the inside of the sputtering device to $1 \times 10^{-6}$ Torr, a mixed gas of argon and nitrogen was introduced and power was supplied to the Al target so as to form a 60 nm-thick transparent dielectric layer 10 formed of AlN on the substrate 9 under the condition of a gas pressure of $4 \times 10^{-3}$ Torr.

Next, after the inside of the sputtering device was evacuated again to $1 \times 10^{-6}$ Torr, an argon gas was introduced and power was supplied to the GdTbFeCo alloy target so as to form a 40 nm-thick reproducing magnetic layer 1 formed of $(Gd_{0.90}Tb_{0.10})_{0.36}$ $(Fe_{0.40}Co_{0.60})_{0.64}$ on the transparent dielectric layer 10 under a gas pressure of $4 \times 10^{-3}$ Torr. The reproducing magnetic layer 1 had such characteristics that it shows an in-plane magnetization state at room temperature and changes into a perpendicular magnetization state at a temperature of 110° C. The reproducing magnetic layer 1 had its Curie temperature at 340° C., no compensation temperature, and a RE-rich composition from room temperature to the Curie temperature.

Subsequently, a mixed gas of argon and nitrogen was introduced and power was supplied to the Al target so as to form a 5 nm-thick non-magnetic intermediate layer 2 formed of AlN on the reproducing magnetic layer 1 under the condition of a gas pressure of $4 \times 10^{-3}$ Torr.

Next, after the inside of the sputtering device was evacuated again to $1 \times 10^{-6}$ Torr, an argon gas was introduced and power was supplied to the TbFeCo alloy target so as to form a 50 nm-thick recording magnetic layer 3 formed of $Tb_{0.23}$ $(Fe_{0.80}Co_{0.20})_{0.77}$ on the non-magnetic intermediate layer 2 under a gas pressure of $4 \times 10^{-3}$ Torr. The recording magnetic layer 3 had its compensation temperature at 25° C. and its Curie temperature at 275° C.

Next, a mixed gas of argon and nitrogen was introduced and power was supplied to the Al target so as to form a 20 nm-thick protective layer 11 formed of AlN on the recording magnetic layer 3 under the condition of a gas pressure of $4 \times 10^{-3}$ Torr.

Finally, an ultraviolet-ray-hardening resin was applied onto the protective layer 11 by spincoating and an ultraviolet ray was applied to form an overcoat layer 12.

(2) Recording and Reproducing Characteristics

A recorded magnetic domain with a mark length of 0.3 μm was formed in the land recording region of the above-mentioned magneto-optical disk under the condition of a linear velocity of 5 m/s by a magnetic-field-modulation recording method, and the recorded magnetic domain was reproduced to find the dependence of the CNR (carrier-to-noise ratio) on the reproducing power with an evaluation device provided with an optical pickup using a semiconductor laser having a wavelength of 680 nm. The result is shown as CNR1 in FIG. 9. Here, the mark length of 0.3 μm means recorded magnetic domains with a length of 0.3 μm corresponding to the mark length, recorded successively at a pitch of 0.6 μm that is twice longer than the mark length.

Figure 9:
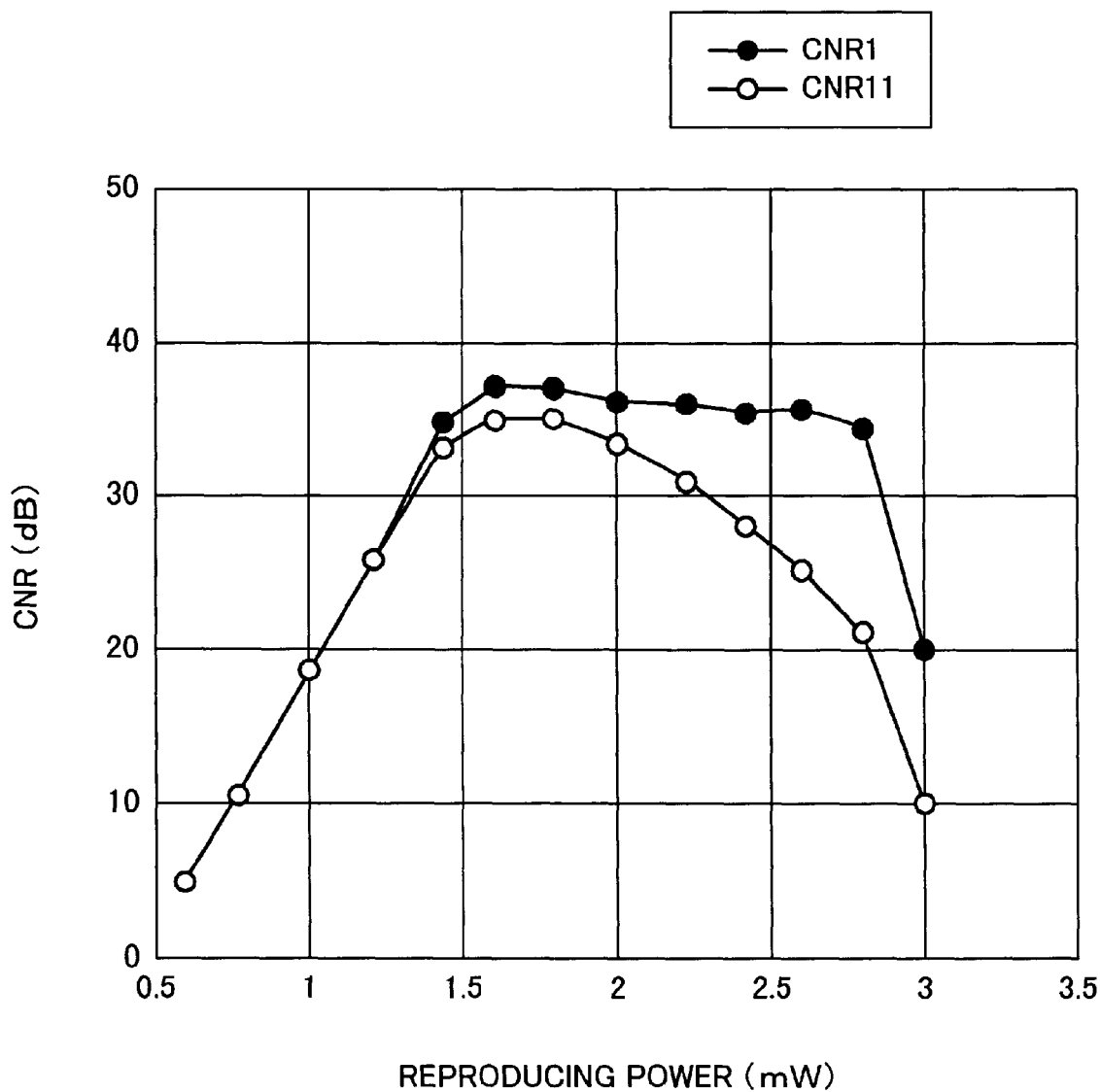
FIG. 9 is a graph showing the dependence of the CNR of the magneto-optical disk of FIG. 8 on the reproducing power.

As Comparative Example 1, the dependance of the CNR of a magneto-optical disk using a 40 nm-thick reproducing magnetic layer 1 formed of $Gd_{0.30}$ $(Fe_{0.70}Co_{0.30})_{0.70}$ on the reproducing power is shown as CNR11 in FIG. 9.

In both of CNR1 (Example 1) and CNR11 (Comparative Example 1), since super resolution reproduction was realized, the reproducing magnetic layer 1 showed a transition from an in-plane magnetization state to a perpendicular magnetization state with an increase of the reproducing power and consequently the CNR was increased. At a reproducing power of 1.6 mW for achieving the maximum CNR, CNR11 was 35 dB, while CNR1 was 37 dB, and thus this example achieved a CNR which was about 2 dB higher than that of Comparative Example 1. This was achieved by the realization of a more stable super resolution reproducing operation in this example in which magnetostatic coupling between the reproducing magnetic layer 1 and the recording magnetic layer 3 was strengthen by the use of GdTbFeCo having a relatively large total magnetization as the reproducing magnetic layer 1.

Moreover, when the reproducing power was increased, CNR11 was lowered abruptly. In contrast, CNR1 showed almost no change. Hence, it will be appreciated that a wider reproducing power margin was obtained in this example. This result was obtained by the use of GdTbFeCo having a relatively large total magnetization within a higher temperature range as the reproducing magnetic layer 1, which achieved sufficiently strong magnetostatic coupling between the reproducing magnetic layer 1 and the recording magnetic layer 3 even in a region where the temperature of the reproducing magnetic layer 1 was raised by the increase of the reproducing power and realized a more stable super resolution reproducing operation in this example.

EXAMPLE 2

Referring to the drawings, another example of the present invention will be explained below.

A magneto-optical disk fabricated in this example had the same structure as the magneto-optical disk of Example 1 described above except that the reproducing magnetic layer 1 was formed by $(Gd_{0.84}Dy_{0.16})_{0.33}(Fe_{0.50}Co_{0.50})_{0.67}$ in a film thickness of 40 nm. Under the same conditions as in Example 1, the recording and reproducing characteristics of this magneto-optical disk were inspected. The dependence of the CNR (carrier-to-noise ratio) of the magneto-optical disk of this example on the reproducing power was measured for a mark length of 0.3 $\mu$m. The result of measurement is shown as CNR2 in FIG. 10 together with the dependence of the CNR on the reproducing power of Comparative Example 1 mentioned in Example 1.

Figure 10:
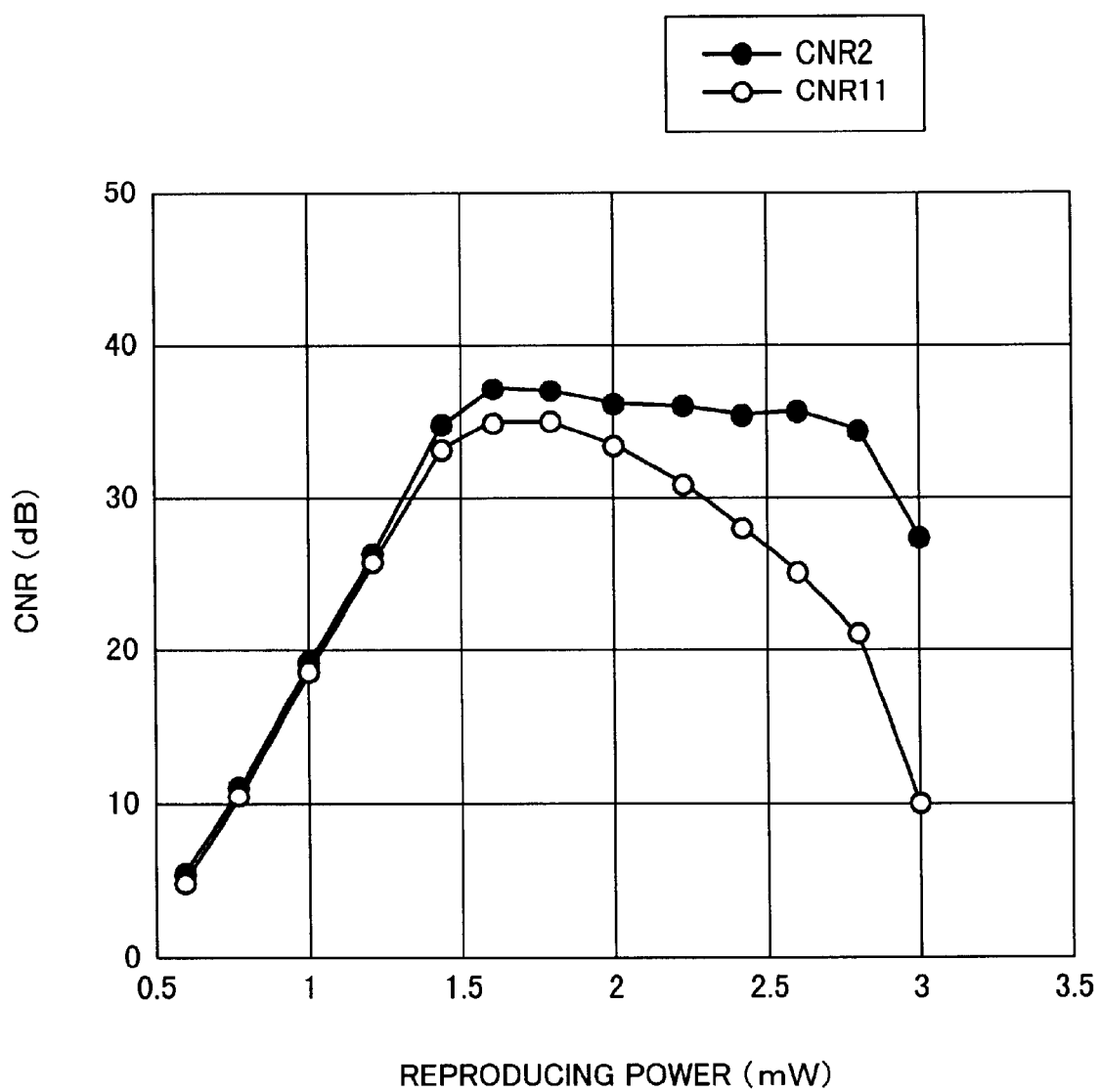
FIG. 10 is a graph showing the dependence of the CNR of a magneto-optical disk as another example of a magneto-optical recording medium according to the present invention on the reproducing power.

It will be appreciated from FIG. 10 that, like Example 1, Example 2 (CNR2) achieved a more stable super resolution reproducing operation, a higher CNR and a wider reproducing power margin, in comparison with Comparative Example 1 (CNR11).

Examples 1 and 2 mentioned above illustrate a structure in which the non-magnetic intermediate layer 2 is provided between the reproducing magnetic layer 1 and the recording magnetic layer 3 so as to achieve stable magnetostatic coupling between the reproducing magnetic layer 1 and recording magnetic layer 3. However, it is not necessarily to limit the present invention to the above structure including the non-magnetic intermediate layer 2 if the reproducing magnetic layer 1 and the recording magnetic layer 3 are magneto-statically coupled at least at temperatures in the vicinity of the critical temperature of the reproducing magnetic layer. For instance, even when a rare-earth metal with a very low Curie temperature, such as Gd, Tb, Dy and Nd, is provided between the reproducing magnetic layer 1 and the recording magnetic layer 3 or a magnetic intermediate layer formed of a transition metal, such as Fe and Co, having such a strong in-plane magnetic anisotropy that it can cut off the exchange coupling between the reproducing magnetic layer 1 and the recording magnetic layer 3 is provided between the reproducing magnetic layer 1 and the recording magnetic layer 3 magnetostatic coupling between the reproducing magnetic layer 1 and the recording magnetic layer 3 can be achieved in a stable manner. In this case, it is also possible to obtain the same reproducing characteristics as in Examples 1 and 2.

EXAMPLE 3

Referring to the drawings, still another example of the present invention will be explained below. Like Examples 1 and 2 described above, the application of a magneto-optical recording medium to a magneto-optical disk will also be explained in this example.

Figure 11:
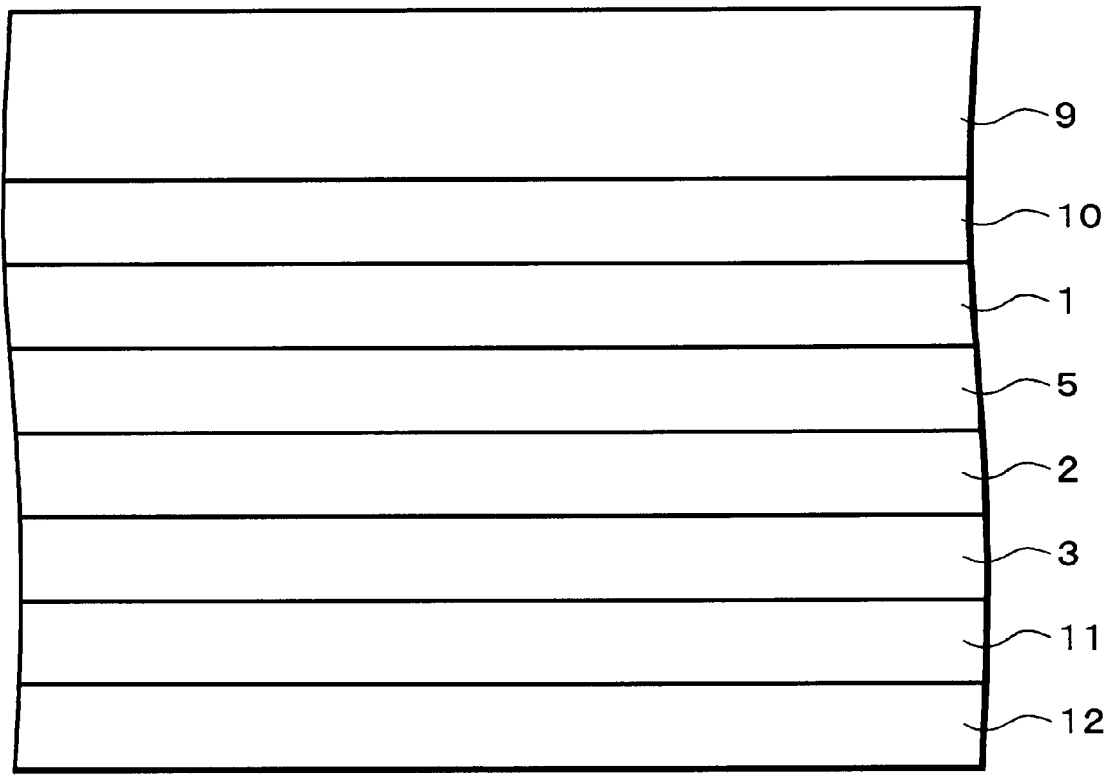
FIG. 11 is an explanatory view explaining a schematic structure of a magneto-optical disk as still another example of a magneto-optical recording medium according to the present invention.

As illustrated in FIG. 11, the magneto-optical disk of this example has a disk main body including a substrate 9, a transparent dielectric layer 10, a reproducing magnetic layer 1, an in-plane magnetization layer 5, a non-magnetic intermediate layer 2, a recording magnetic layer 3 a protective layer 11 and an overcoat layer 12 arranged in this order.

In this example, in the same manner as in Example 1, after forming the transparent dielectric layer 10 in a film thickness of 60 nm on the substrate 9, the reproducing magnetic layer 1 formed of $(Gd_{0.90}Tb_{0.10})_{0.36}$ $(Fe_{0.40}Co_{0.60})_{0.64}$ was formed in a film thickness of 20 nm. The reproducing magnetic layer 1 had such characteristics that it showed an in-plane magnetization state at room temperature and changed into a perpendicular magnetization state at a temperature of 110° C. The reproducing magnetic layer 1 had its Curie temperature at 340° C., no compensation temperature, and a RE-rich composition from room temperature to the Curie temperature.

After forming the reproducing magnetic layer 1, power was supplied to a GdFeCo alloy target which was separately prepared, thereby forming the in-plane magnetization layer 5 formed of $Gd_{0.10}(Fe_{0.97}Co_{0.03})_{0.90}$ in a film thickness of 20 nm on the reproducing magnetic layer 1. The in-plane magnetization layer 5 had its Curie temperature at 150° C., and a TM-rich composition which showed an in-plane magnetization state from room temperature to the Curie temperature.

Next, in the same manner as in Example 1, the 5 nm-thick non-magnetic intermediate layer 2 formed of AlN, the 50 nm-thick recording magnetic layer 3 formed of $Tb_{0.23}$ $(Fe_{0.80}Co_{0.20})_{0.77,}$ the 20 nm-thick protective layer 11 formed of AlN and the overcoat layer 12 were formed to fabricate the magneto-optical disk of this example.

Figure 12:
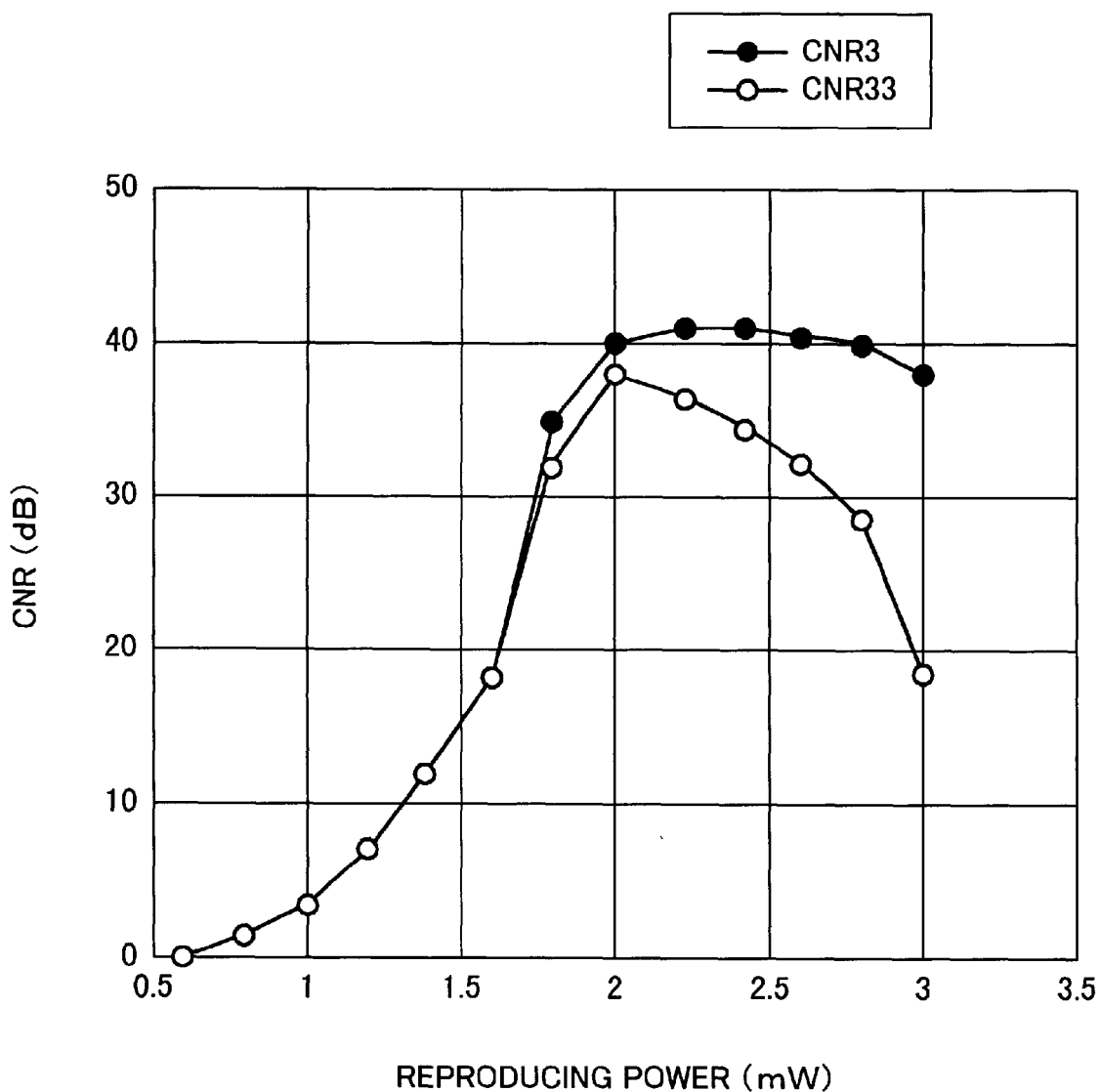
FIG. 12 is a graph showing the dependence of the CNR of the magneto-optical disk of FIG. 11 on the reproducing power.

Like Example 1, a recorded magnetic domain with a mark length of 0.3 $\mu$m was formed in the land recording region of this magneto-optical disk by the magnetic-field-modulation recording method under the condition of a linear velocity of 5 m/s by the evaluation device provided with an optical pickup using a semiconductor laser having a wavelength of 680 nm. This recorded magnetic domain was reproduced to measure the dependence of the CNR (carrier-to-noise ratio) on the reproducing power. The result of measurement is shown as CNR3 in FIG. 12.

Figure 15:
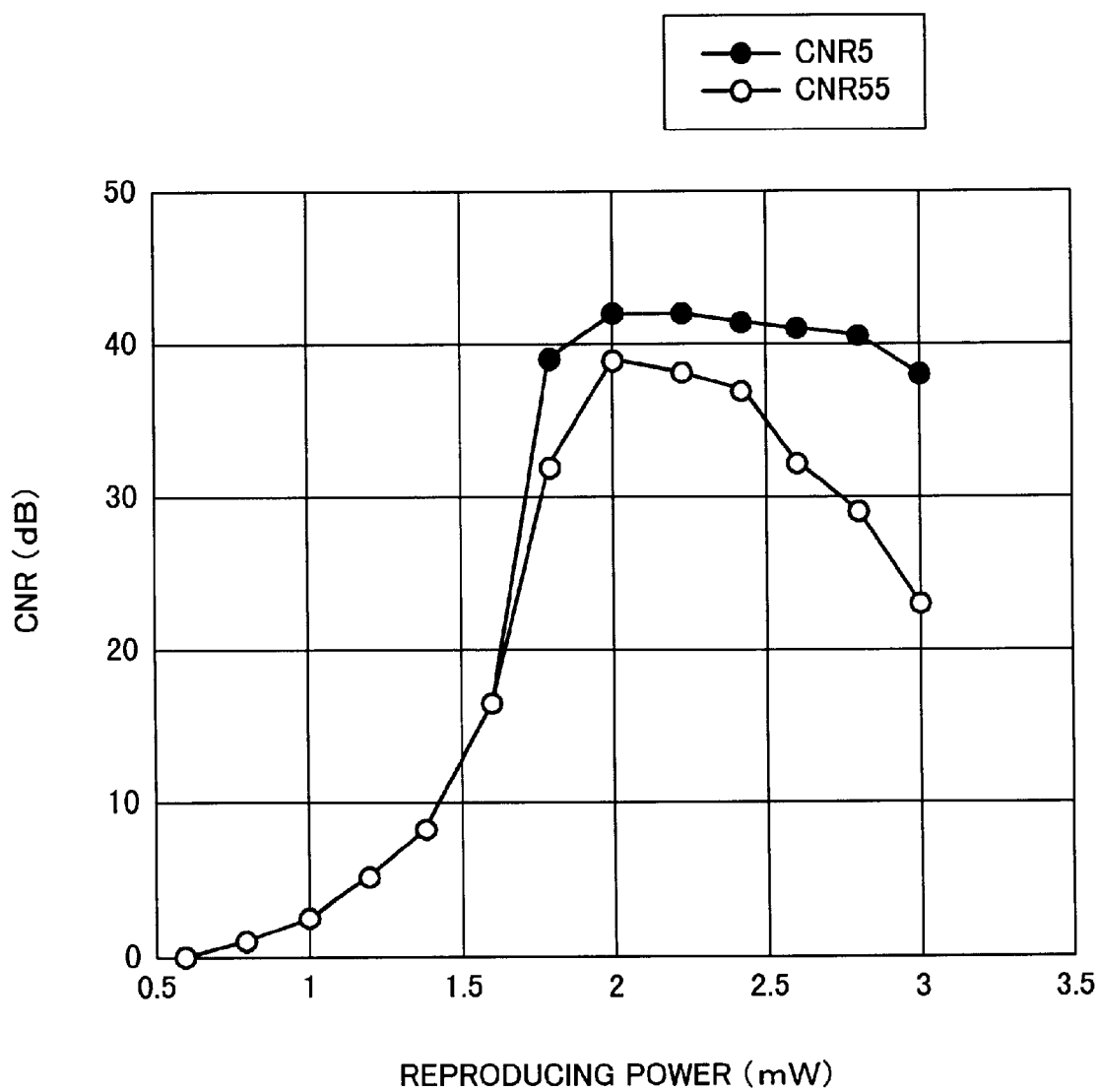
FIG. 15 is a graph showing the dependence of the CNR of the magneto-optical disk of FIG. 14 on the reproducing power.

Moreover, a magneto-optical disk using a 20 nm-thick $Gd_{0.30}(Fe_{0.70}Co_{0.30})_{0.70}$ film as the reproducing magnetic layer 1 in the structure of the magneto-optical disk of Example 3 was prepared as Comparative Example 3 and measured to find the dependence of the CNR on the reproducing power. The result of measurement is shown as CNR33 in FIG. 15.

CNR3 of this example shows that an in-plane magnetization mask in a low-temperature region is strengthen by the in-plane magnetization layer 5, the reproduction resolution is improved, the CNR at a low reproducing power is lowered compared with CNR1 of Example 1, and a higher CNR of 41 dE than that of Example 1 is obtained at a reproducing power of 2 mW.

Furthermore, it will be appreciated by comparing CNR3 obtained by the use of GdTbFeCo as the reproducing magnetic layer 1 and CNR33 obtained by the use of GdFeCo as the reproducing magnetic layer 1 that, like Example 1, the magnetostatic coupling between the reproducing magnetic layer 1 and recording magnetic layer 3 was strengthen. Thus, in this example, a more stable super resolution reproducing operation was achieved, a higher CNR and a wider reproduction margin were obtained.

EXAMPLE 4

Referring to the drawings, still another example of the present invention will be explained below.

In this example, a magneto-optical disk was fabricated by only replacing the reproducing magnetic layer 1 with a 20 nm-thick film of $(Gd_{0.84}Dy_{0.16})_{0.33}(Fe_{0.50}Co_{0.50})_{0.67}$ in the structure of the magneto-optical disk of Example 3. Under the same conditions as in Example 3, the recording and reproducing characteristics of this magneto-optical disk were inspected. The magneto-optical disk of this example was measured to find the dependence of the CNR (carrier-to-noise ratio) on the reproducing power for a mark length of 0.3 μm. The result of measurement is shown as CNR4 in FIG. 13 together with the dependence of the CNR on the reproducing power of Comparative Example 3 used in Example 3.

Figure 13:
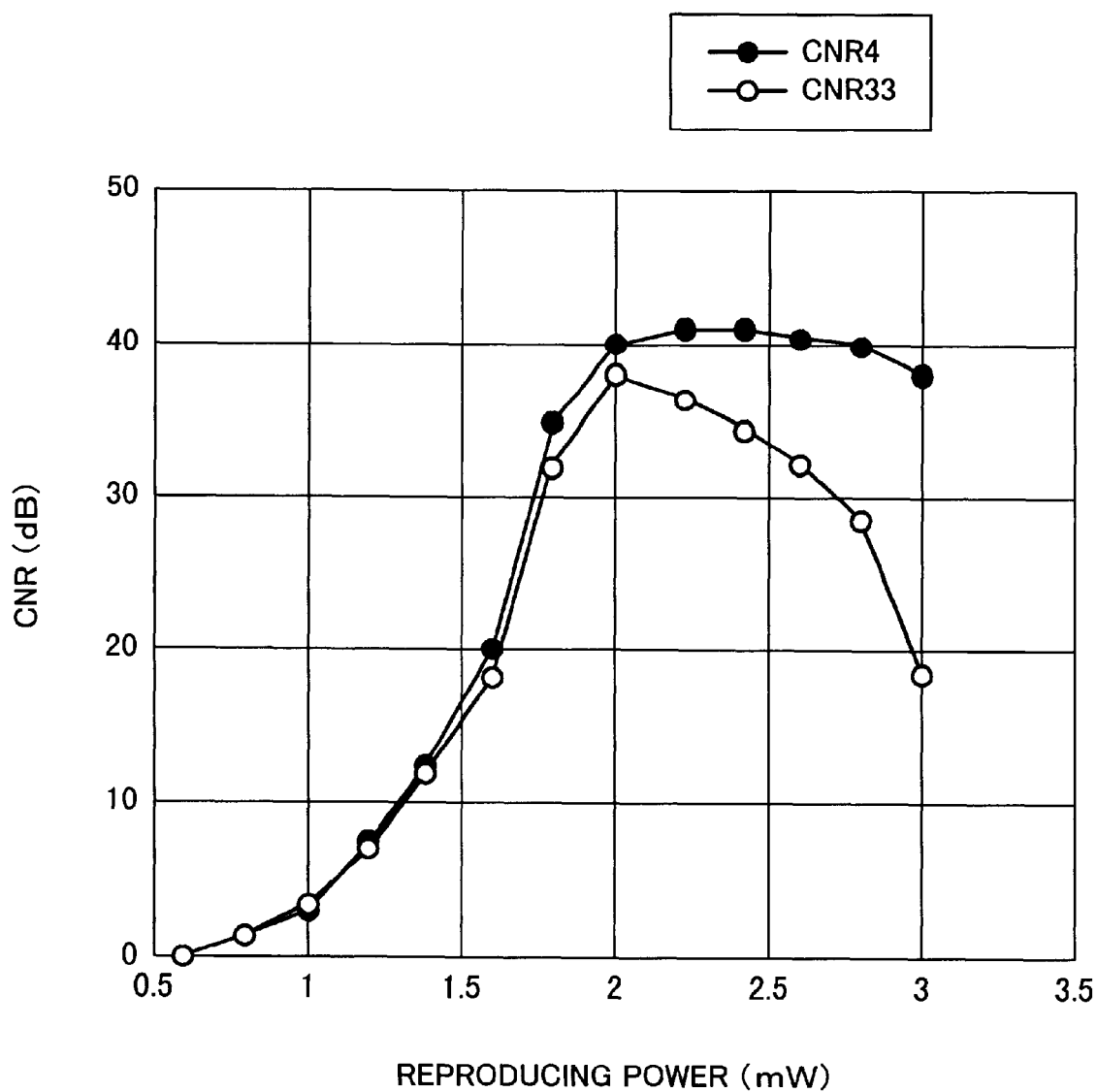
FIG. 13 is a graph showing the dependence of the CNR of a magneto-optical disk as still another example of a magneto-optical recording medium according to the present invention.

Like Example 3, it will be appreciated from FIG. 13 that a more stable super resolution reproducing operation was achieved, a higher CNR and a wider reproduction margin were obtained in this example in comparison with Comparative Example 3.

Examples 3 and 4 described above illustrate the structures in which the non-magnetic intermediate layer 2 is provided between the in-plane magnetization layer 5 and the recording layer 3 so as to achieve more stable magnetostatic coupling between the reproducing magnetic layer 1 and in-plane magnetization layer 5 and the recording magnetic layer 3. However, it is not necessarily to limit the present invention to the above structures including the non-magnetic intermediate layer 2 if the reproducing magnetic layer 1 and the recording magnetic layer 3 are magneto-statically coupled at least at temperatures in the vicinity of the critical temperature of the reproducing magnetic layer 1.

For instance, even when a rare-earth metal with a very low Curie temperature, such as Gd, Tb, Dy and Nd, is provided between the in-plane magnetization layer 5 and the recording magnetic layer 3 or a transition metal, such as Fe and Co, having such a strong in-plane magnetic anisotropy that it can cut off the exchange coupling between the in-plane magnetization layer 5 and the recording magnetic layer 3 is provided between the in-plane magnetization layer 5 and the recording magnetic layer 3 magnetostatic coupling between the reproducing magnetic layer 1 and the recording magnetic layer 3 can be achieved in a stable manner. In this case, it is also possible to obtain the same reproducing characteristics as in Examples 3 and 4. Moreover, it is possible to achieve magnetostatic coupling between the reproducing magnetic layer 1 and the recording magnetic layer 3 in a stable manner by further increasing the film thickness of the in-plane magnetization layer 5. In this case, it is also possible to obtain the same reproducing characteristics as in Examples 3 and 4.

Furthermore, it is desirable in the structures of Examples 3 and 4 that the film thickness of the reproducing magnetic layer 1 is not less than 10 nm, but not more than 60 nm. By reducing the film thickness of the reproducing magnetic layer 1, the effect of exchange coupling by the in-plane magnetization layer 5 is relatively strengthen, thereby achieving higher reproduction resolution. However, if the film thickness is less than 10 nm, the reflected light from the reproducing magnetic layer 1 is reduced and the intensity of the reproduced signal is lowered noticeably. On the other hand, if the film thickness of the reproducing magnetic layer 1 is more than 60 nm, since the effect of exchange coupling by the in-plane magnetization layer 5 is relatively diminished, an improvement of reproduction resolution will not be achieved and the recording sensitivity deteriorates notably due to the increase in the film thickness.

In addition, it is desirable in the structures of Examples 3 and 4 that the film thickness of the in-plane magnetization layer 5 is not less than 5 nm. If the film thickness of the in-plane magnetization layer 5 is reduced, the effect of the in-plane magnetization layer 5 is relatively diminished, and an improvement of reproduction resolution will not be achieved with the in-plane magnetization layer 5 with a film thickness less than 5 nm.

Furthermore, it is desirable in the structures of Examples 3 and 4 that the total film thickness of the in-plane magnetization layer 5 and the non-magnetic intermediate layer 2 is less than 60 nm. If the total film thickness is more than 60 nm, since the distance between the recording magnetic layer 3 and the reproducing magnetic layer 1 increases, stable magnetostatic coupling can not be retained.

EXAMPLE 5

Referring to the drawings, still another example of the present invention will be explained below. In this example, like the above-described Examples, the application of a magneto-optical recording medium to a magneto-optical disk will be explained.

As illustrated in FIG. 14, a magneto-optical disk of this example has a disk main body including a substrate 9, a transparent dielectric layer 10, a reproducing magnetic layer 1, a first in-plane magnetization layer 6, a second in-plane magnetization layer 7, a non-magnetic intermediate layer 2, a recording magnetic layer 3 a protective layer 11 and an overcoat layer 12 arranged in this order.

In this example, in the same manner as in Example 1, after forming the transparent dielectric layer 10 in a film thickness of 60 nm on the substrate 9, the reproducing magnetic layer 1 formed of $(Gd_{0.9}Tb_{0.10})_{0.36}(Fe_{0.40}Co_{0.06})_{0.64}$ was formed in a film thickness of 20 nm. The reproducing magnetic layer 1 had such characteristics that it showed an in-plane magnetization state at room temperature and changed into a perpendicular magnetization state at a temperature of 110° C. The reproducing magnetic layer 1 had its Curie temperature at 340° C., no compensation temperature, and a RE-rich composition from room temperature to the Curie temperature.

After forming the reproducing magnetic layer 1, power was supplied to a first GdFeCo alloy target which was separately prepared, thereby forming the first in-plane magnetization layer 6 of $Gd_{0.10}(Fe_{0.97}Co_{0.03})_{0.90}$ in a film thickness of 10 nm. The in-plane magnetization layer 6 was an in-plane magnetization film having its Curie temperature at 150° C. and a TM-rich composition showing an in-plane magnetization state from room temperature to the Curie temperature.

Subsequently, power was supplied to a second GdFeCo alloy target which was separately prepared, thereby forming the second in-plane magnetization layer 7 of $Gd_{0.48}$ $(Fe_{0.95}Co_{0.05})_{0.52}$ in a film thickness of 10 nm on the first in-plane magnetization layer 6. The in-plane magnetization layer 7 was an in-plane magnetization film having its Curie temperature at 150° C. and a RM-rich composition showing an in-plane magnetization state from room temperature to the Curie temperature.

Next, in the same manner as in Example 1, the 5nm-thick non-magnetic intermediate layer 2 formed of AlN, the 50 nm-thick recording magnetic layer 3 formed of $Tb_{0.23}$ $(Fe_{0.80}Co_{0.20})_{0.77}$, the 20 nm-thick protective layer 11 formed of AlN and the overcoat layer 12 were formed to fabricate the magneto-optical disk of this example.

Like Example 1, a recorded magnetic domain with a mark length of 0.3 µm was formed in the land recording region of this magneto-optical disk by the magnetic-field-modulation recording method under the condition of a linear velocity of 5 m/s by the evaluation device provided with an optical pickup using a semiconductor laser having a wavelength of 680 nm. This recorded magnetic domain was reproduced so as to measure the dependence of the CNR (carrier-to-noise ratio) on the reproducing power. The result of measurement is shown as CNR5 in FIG. 15.

Moreover, a magneto-optical disk using a 20 nm-thick $Gd_{0.30}(Fe_{0.70}Co_{0.30})_{0.70}$ film as the reproducing magnetic layer 1 in the structure of the magneto-optical disk of this example was prepared as Comparative Example 5 and measured to find the dependence of the CNR on the reproducing power. The result of measurement is shown as CNR55 in FIG. 15.

CNR5 of this example shows that an in-plane magnetization mask in a low-temperature region was strengthen and the reproduction resolution was improved by the use of the first in-plane magnetization layer 6 and second in-plane magnetization layer 7. Moreover, in comparison with CNR1 of Example 1 and CNR3 of Example 3, the CNR at a low reproducing power was lowered, and a higher CNR of 42 dB than that of Examples 1 and 3 was obtained at a reproducing power of 2 mW.

Furthermore, it will be appreciated by comparing CNR5 obtained by the use of GdTbFeCo as the reproducing magnetic layer 1 and CNR55 obtained by the use of GdFeCo as the reproducing magnetic layer 1 that, like Examples 1 and 3, since the magnetostatic coupling between the reproducing magnetic layer 1 and recording magnetic layer 3 was strengthen in this example, a more stable super resolution reproducing operation was achieved, a higher CNR and a wider reproducing power margin were obtained.

EXAMPLE 6

Referring to the drawings, still another example of the present invention will be explained below.

In this example, a magneto-optical disk was fabricated by only replacing the reproducing magnetic layer 1 with a 20 nm-thick film of $(Gd_{0.84}Dy_{0.16})_{0.33}(Fe_{0.50}Co_{0.50})_{0.67}$ in the structure of the magneto-optical disk of Example 5. Under the same conditions as in Example 5, the recording and reproducing characteristics of this magneto-optical disk were inspected. The magneto-optical disk of this example was measured to find the dependence of the CNR (carrier-to-noise ratio) on the reproducing power for a mark length of 0.3 µm. The result of measurement is shown as CNR6 in FIG. 16 together with the dependence of the CNR on the reproducing power of Comparative Example 5 used in Example 5.

Figure 16:
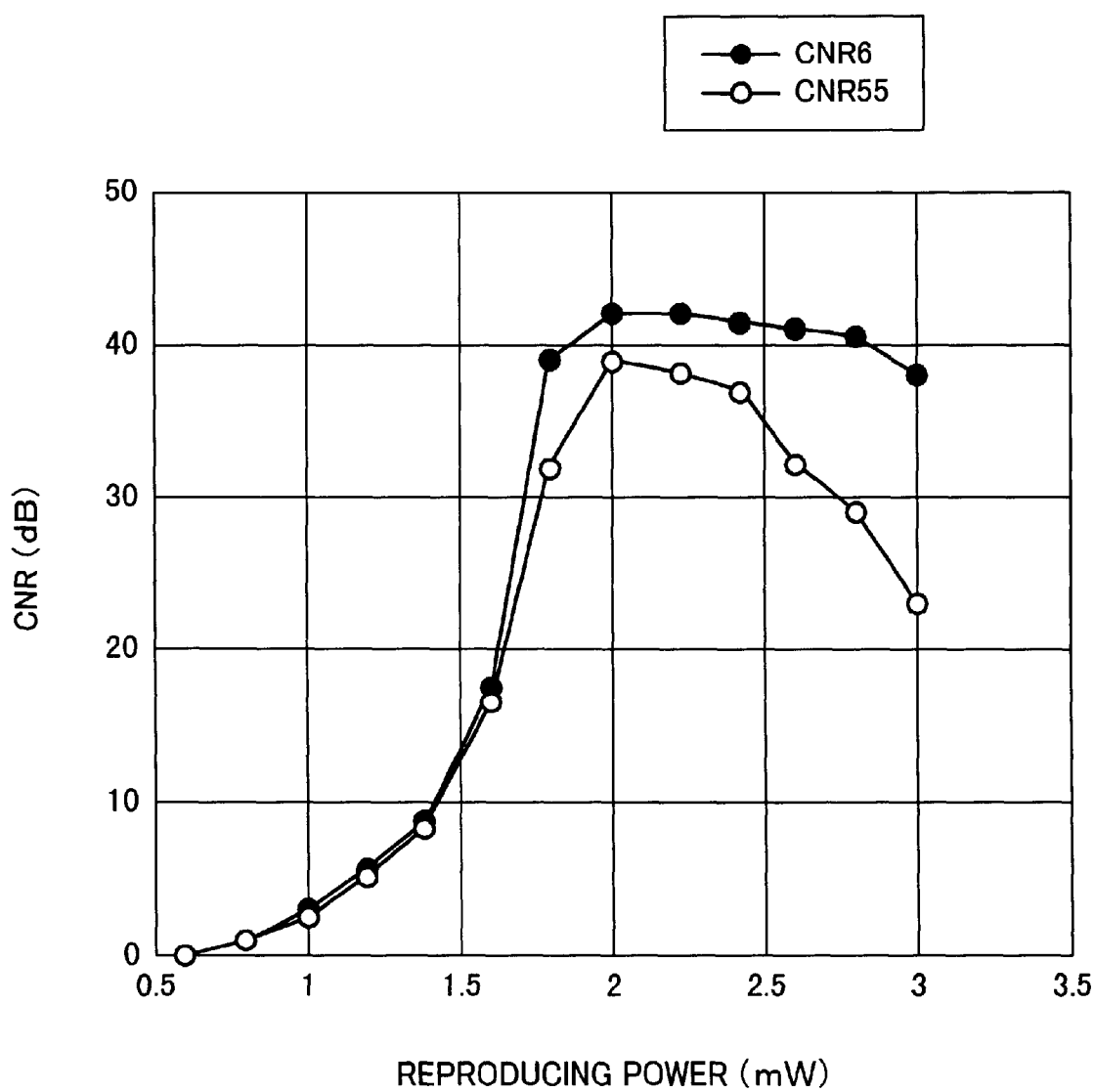
FIG. 16 is a graph showing the dependence of the CNR of a magneto-optical disk as still another example of a magneto-optical recording medium according to the present invention on the reproducing power.

Like Example 5, it will be appreciated from FIG. 16 that a more stable super resolution reproducing operation was achieved, a higher CNR and a wider reproduction margin were obtained in this example in comparison with Comparative Example 5.

Examples 5 and 6 described above illustrate the structures in which the non-magnetic intermediate layer 2 is provided between the second in-plane magnetization layer 7 and the recording magnetic layer 3 so as to achieve more stable magnetostatic coupling between the reproducing magnetic layer 1, first in-plane magnetization layer 6 and second in-plane magnetization layer 7 and the recording magnetic layer 3. However, it is not necessarily to limit the present invention to the above structures including the non-magnetic intermediate layer 2 if the reproducing magnetic layer 1 and the recording magnetic layer 3 are magneto-statically coupled.

For instance, even when a rare-earth metal with a very low Curie temperature, such as Gd, Tb, Dy and Nd, is provided between the second in-plane magnetization layer 7 and the recording magnetic layer 3 or a transition metal, such as Fe and Co, having such a strong in-plane magnetic anisotropy that it can cut off the exchange coupling between the second in-plane magnetization layer 7 and the recording magnetic layer 3 is provided between the second in-plane magnetization layer 7 and the recording magnetic layer 3 magnetostatic coupling between the reproducing magnetic layer 1 and the recording magnetic layer 3 can be achieved in a stable manner. In this case, it is also possible to obtain the same reproducing characteristics as in Examples 5 and 6.

Moreover, it is also possible to achieve magnetostatic coupling between the reproducing magnetic layer 1 and the recording magnetic layer 3 in a stable manner by further increasing the film thickness of each of the first in-plane magnetization layer 5 and second in-plane magnetization layer 7. In this case, it is also possible to obtain the same reproducing characteristics as in Examples 5 and 6.

Furthermore, it is desirable in the structures of Examples 5 and 6 that the film thickness of the reproducing magnetic layer 1 is not less than 10 nm, but not more than 60 nm. By reducing the film thickness of the reproducing magnetic layer 1, the effects of exchange coupling from the first in-plane magnetization layer 6 and second in-plane magnetization layer 7 are relatively strengthen and higher reproduction resolution is obtainable. However, if the film thickness is less than 10 nm, the reflected light from the reproducing magnetic layer 1 is reduced and the intensity of the reproduced signal is lowered noticeably. On the other hand, if the film thickness of the reproducing magnetic layer 1 is more than 60 nm, since the effects of exchange coupling from the first in-plane magnetization layer 6 and second in-plane magnetization layer 7 are relatively diminished, an improvement of reproduction resolution will not be achieved and the recording sensitivity deteriorates notably due to the increase in the film thickness.

In addition, it is desirable in the structures of Examples 5 and 6 that the film thickness of each of the first in-plane magnetization layer 6 and second in-plane magnetization layer 7 is not less than 5 nm. If the film thickness of each of the first in-plane magnetization layer 6 and second in-plane magnetization layer 7 is reduced, the effects of the first in-plane magnetization layer 6 and second in-plane magnetization layer 7 are relatively diminished, and an improvement of reproduction resolution will not be achieved.

Furthermore, it is desirable in the structures of Examples 5 and 6 that the total film thickness of the first in-plane magnetization layer 6, second in-plane magnetization layer 7 and the non-magnetic intermediate layer 2 is less than 60 nm. If the total film thickness is more than 60 nm, since the distance between the recording magnetic layer 3 and the reproducing magnetic layer 1 increases, stable magnetostatic coupling can not be retained.

EXAMPLE 7

Referring to the drawings, still another example of the present invention will be explained below.

In this example, the application of a magneto-optical recording medium to a magneto-optical disk will be explained.

Figure 17:
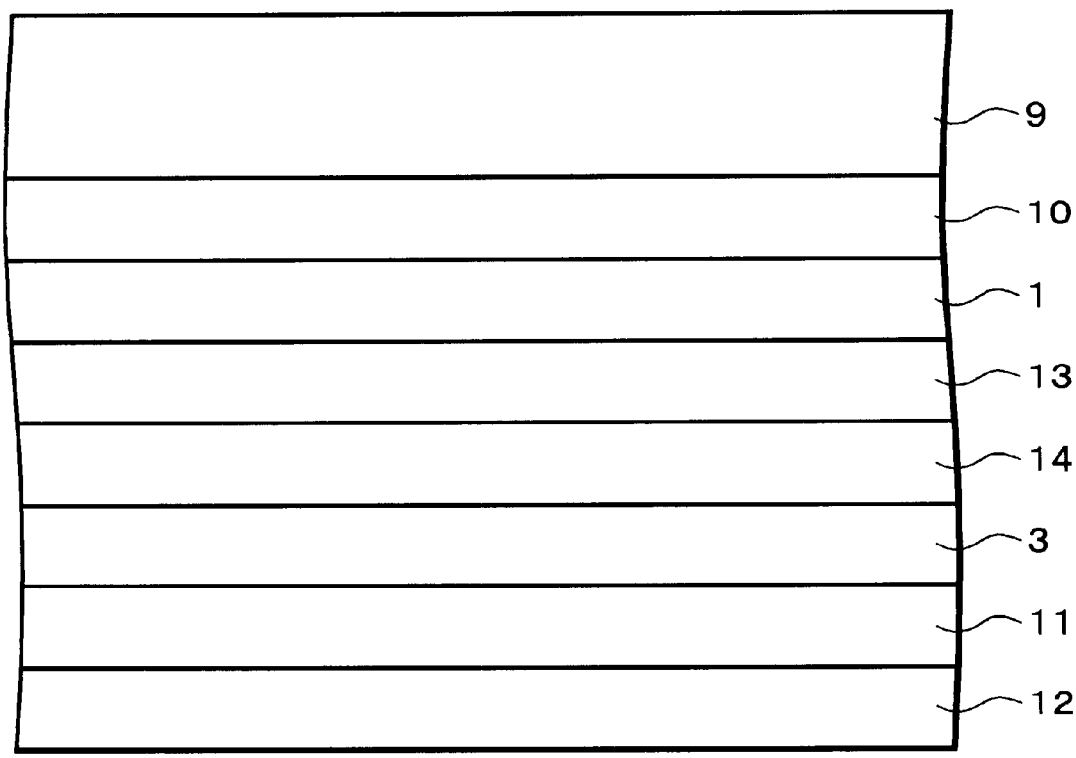
FIG. 17 is an explanatory view showing a schematic structure of a magneto-optical disk as still another example of a magneto-optical recording medium according to the present invention.

As illustrated in FIG. 17, a magneto-optical disk of this example has a structure in which a substrate 9, a dielectric transparent dielectric layer 10, a reproducing magnetic layer 1, a non-magnetic intermediate layer 13 formed of a transparent dielectric material, a reflective layer 14, a recording magnetic layer 3 a protective layer 11 and an overcoat layer 12 are arranged in this order.

The magneto-optical disk of this example allows an increase of the Kerr rotation angle by the use of an interference effect produced by a multi-layer structure including the non-magnetic intermediate layer 13 formed of a transparent dielectric material in place of the non-intermediate magnetic layer 2 of the above-described examples and further including the reflective layer 14. Besides, since the light beam 4 is reflected by the reflective layer 14, the reproduction of a signal from the recording magnetic layer 3 is perfectly intercepted and only the information copied to the reproducing magnetic layer 1 can be reproduced, thereby improving the super resolution reproducing characteristics.

In the same manner as in the fabrication method of the magneto-optical disk of Example 1, the magneto-optical disk of this example was fabricated by forming the 60 nm-thick transparent dielectric layer 10 formed of AlN, the 40 nm-thick reproducing magnetic layer 1 formed of $(Gd_{0.90}Tb_{0.10})_{0.36}(Fe_{0.40}Co_{0.60})_{0.64}$ the 10 nm-thick non-magnetic intermediate layer 13 formed of AlN, which is transparent to the light beam 4, the 10 nm-thick reflective layer 14 formed of $Al_{0.8}Ti_{0.2}$ the 50 nm-thick recording magnetic layer 3 formed of $Tb_{0.23}(Fe_{0.80}Co_{0.20})_{0.77}$, the 20 nm-thick protective layer 11 formed of AlN and the overcoat layer 12 in this order on the substrate 9.

Like Example 1, the CNR of the magneto-optical disk of this example was measured for a mark length of 0.3 μm. As a result, it was confirmed that the CNR of this example was 38 dB at a reproducing power of 2.0 mW, while the CNR of Example 1 was 37 dB at a reproducing power of 1.6 mW, and thus better super resolution reproducing characteristics were obtained in this example than Example 1. Moreover, in this example , a wide reproducing power margin was obtained as in Example 1.

In this example, as the non-magnetic intermediate layer 13 formed of a transparent dielectric material, it is possible to use non-magnetic dielectric materials, such as AlN, SiN and $Ta_2O_3$. Besides, as the reflective layer 14, it is possible to use non-magnetic metals, such as Al, Ti, Ta, Pt, Au and Cu, or alloys of such non-magnetic metals.

Furthermore, in order to obtain a satisfactory interference effect, it is desirable that the transparent dielectric layer 10 has a film thickness within a range of from 40 nm to 100 nm, and the reproducing magnetic layer 1 has a film thickness of not more than 50 nm. If the film thickness of the transparent dielectric layer 10 is more than 50 nm, since the amount of light passed through the reproducing magnetic layer 1 is reduced, it is difficult to increase the Kerr rotation angle by the interference effect.

Additionally, in order to increase the Kerr rotation angle efficiently, it is desirable that the film thickness of the non-magnetic intermediate layer 13 formed of a transparent dielectric material is within a range of from 5 nm to 30 nm.

Moreover, in order to reproduce only the information copied to the reproducing magnetic layer 1 by perfectly intercepting the reproduction of a signal from the recording magnetic layer 3 by the reflective layer 14, the reflective layer 14 needs to have a film thickness of at least 5 nm or more.

Furthermore, it is desirable that the total film thickness of the non-magnetic intermediate layer 13 and the reflective layer 14 is not more than 60 nm. If the total film thickness is more than 60 nm, since the distance between the reproducing magnetic layer 1 and the recording magnetic layer 3 is too large, the magnetostatic coupling forces therebetween is weaker and stable reproduction can not be carried out.

This example illustrates the use of GdTbFeCo as the reproducing magnetic layer 1. However, even when GdDyFeCo is used as the reproducing magnetic layer 1, the same reproducing characteristics as in this example can be obtained.

EXAMPLE 8

Referring to the drawings, still another example of the present invention will be explained below. Like the above-described examples, this example explains the application of a magneto-optical recording medium to a magneto-optical disk.

Figure 18:
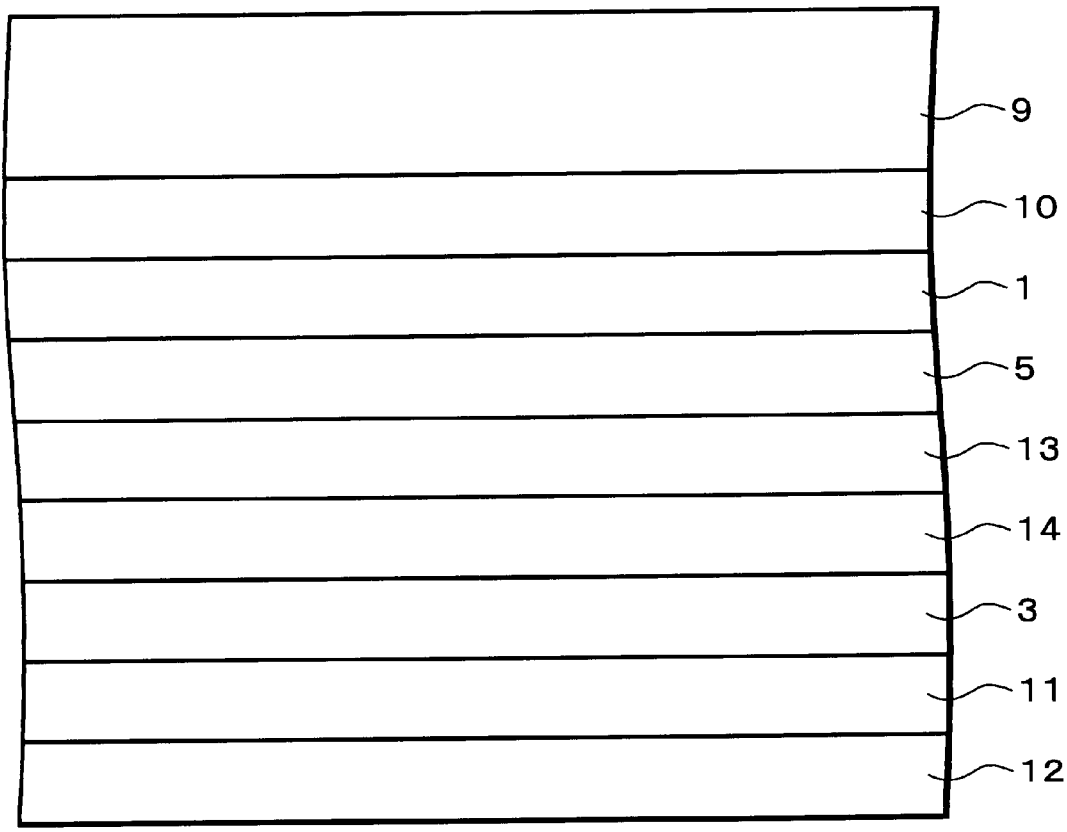
FIG. 18 is an explanatory view showing a schematic structure of a magneto-optical disk as still another example of a magneto-optical recording medium according to the present invention.

As illustrated in FIG. 18, a magneto-optical disk of this example has a structure in which a substrate 9, a transparent dielectric layer 10, a reproducing magnetic layer 1, an in-plane magnetization layer 5, a non-magnetic intermediate layer 13 formed of a transparent dielectric material, a reflective layer 14, a recording magnetic layer 3 a protective layer 11 and an overcoat layer 12 are arranged in this order.

The magneto-optical disk of this example allows an increase of the Kerr rotation angle by the use of an interference effect produced by a multi-layer structure which includes the non-magnetic intermediate layer 13 formed of a transparent dielectric material in place of the non-intermediate magnetic layer 2 in the structure of Example 3 and further includes the reflective layer 14. Besides, since the light beam 4 is reflected by the reflective layer 14, the reproduction of a signal from the recording magnetic layer 3 is perfectly intercepted and only the information copied to the reproducing magnetic layer 1 can be reproduced, thereby improving the super resolution reproducing characteristics.

In the same manner as in the fabrication method of the magneto-optical disks as explained in the above-described examples, the magneto-optical disk of this example was fabricated by forming the 60 nm-thick transparent dielectric layer 10 formed of AlN, the 20 nm-thick reproducing magnetic layer 1 formed of $(Gd_{0.90}tb_{0.10})_{0.38}(Fe_{0.40}Co_{0.60})_{0.62}$, the 20 nm-thick in-plane magnetization layer 5 formed of $Gd_{0.10}(Fe_{0.97}Co_{0.03})_{0.90}$, the 10 nm-thick non-magnetic intermediate layer 13 formed of AlN, which is transparent to the light beam 4, the 10 nm-thick reflective layer 14 formed of $Al_{0.8}Ti_{0.2}$, the 50 nm-thick recording magnetic layer 3 formed of $Tb_{0.23}(Fe_{0.80}Co_{0.20})_{0.77}$, the 20 nm-thick protective layer 11 formed of AlN and the overcoat layer 12 in this order on the substrate 9.

Like Example 3, the CNR of the magneto-optical disk of this example was measured for a mark length of 0.3 μm. As a result, it was confirmed that the CNR of this example was 42 dB at a reproducing power of 2.4 mW, while the CNR of Example 3 was 41 dB at a reproducing power of 2.0 mW and thus better super resolution reproducing characteristics were obtained in this example than Example 3. Moreover, in this example, a wide reproducing power margin was obtained as in Example 3.

In the structure of this example, as the non-magnetic intermediate layer 13 formed of a transparent dielectric material, it is possible to use non-magnetic metals, such as AlN, SiN, AlSiN and $Ta_2O_3$. Besides, as the reflective layer 14, it is possible to use non-magnetic metals, such as Al, Ti, Ta, Pt, Au and Cu, or alloys of such non-magnetic metals.

Furthermore, in order to obtain a satisfactory interference effect, it is desirable that the film thickness of the transparent dielectric layer 10 is within a range of from 40 nm to 100 nm and the total film thickness of the reproducing magnetic layer 1 and in-plane magnetization layer 5 is not more than 50 nm like Example 3. If the total film thickness is more than 50 nm, since the amount of light passed through the reproducing magnetic layer 1 is reduced, it is difficult to increase the Kerr rotation angle by the interference effect.

Additionally, in order to increase the Kerr rotation angle efficiently, it is desirable that the film thickness of the non-magnetic intermediate layer 13 formed of a transparent dielectric material is within a range of from 5 nm to 30 nm.

Furthermore, in order to perfectly intercept the reproduction of a signal from the recording magnetic layer 3 by the reflective layer 14 and reproduce only the information copied to the reproducing magnetic layer 1, the reflective layer 14 needs to have a film thickness of at least 5 nm or more.

Additionally, it is desirable that the total film thickness of the in-plane magnetization layer 5, the non-magnetic intermediate layer 13 formed of a transparent dielectric material and the reflective layer 14 is not more than 60 nm. If the total film thickness is more than 60 nm, since the distance between the reproducing magnetic layer 1 and the recording magnetic layer 3 is too large, the magnetostatic coupling forces therebetween are weaker and stable reproduction can not be carried out.

This example illustrate the use of GdTbFeCo as the reproducing magnetic layer 1. However, even when GdDyFeCo is used as the reproducing magnetic layer 1, it is possible to obtain the same reproducing characteristics as in this example.

EXAMPLE 9

Referring to the drawings, still another example of the present invention will be explained below. Like Examples 1 and 2 as described above, this example explains the application of a magneto-optical recording medium to a magneto-optical disk.

Figure 19:
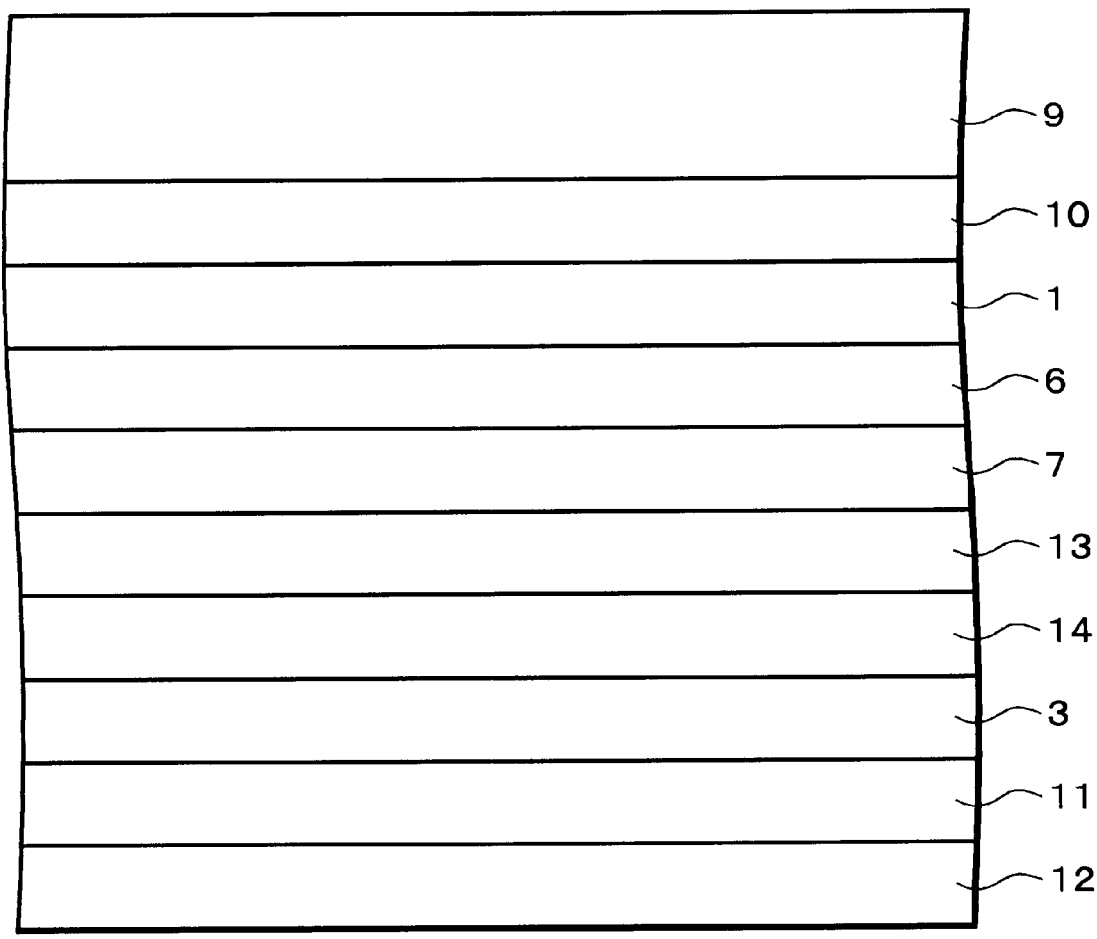
FIG. 19 is an explanatory view showing a schematic structure of a magneto-optical disk as still another example of a magneto-optical recording medium according to the present invention.

As illustrated in FIG. 19, a magneto-optical disk of this example has a structure in which a substrate 9, a transparent dielectric layer 10, a reproducing magnetic layer 1, a first in-plane magnetization layer 6, a second in-plane layer 7, a non-magnetic intermediate layer 13 formed of a transparent dielectric material, a reflective layer 14, a recording magnetic layer 3 a protective layer 11 and an overcoat layer 12 are arranged in this order.

The magneto-optical disk of this example allows an increase of the Kerr rotation angle by the use of an interference effect produced by a multi-layer structure which includes the non-magnetic intermediate layer 13 formed of a transparent dielectric material in place of the non-intermediate magnetic layer 2 in the structure of Example 5 and further includes the reflective layer 14. Besides, since the light beam 4 is reflected by the reflective layer 14, the reproduction of a signal from the recording magnetic layer 3 is perfectly intercepted and only the information copied to the reproducing magnetic layer 1 can be reproduced, thereby improving the super resolution reproducing characteristics.

In the same manner as in the fabrication method of the magneto-optical disk as explained in Example 5, the magneto-optical disk of this example was fabricated by forming the 60 nm-thick transparent dielectric layer 10 formed of AlN, the 20 nm-thick reproducing magnetic layer 1 formed of $(Gd_{0.90}Tb_{0.10})_{0.36}(Fe_{0.40}Co_{0.60})_{0.64}$, the 10 nm-thick first in-plane magnetization layer 6 formed of $Gd_{0.10}(Fe_{0.97}Co_{0.03})_{0.90}$, the 10 nm-thick second in-plane magnetization layer 7 formed of $Gd_{0.48}(Fe_{0.95}Co_{0.05})_{0.52}$, the 10 nm-thick non-magnetic intermediate layer 13 formed of AlN, which is transparent to the light beam 4, the 10 nm-thick reflective layer 14 formed of $Al_{0.8}Ti_{0.2}$, the 50 nm-thick recording magnetic layer 3 formed of $Tb_{0.23}(Fe_{0.80}Co_{0.20})_{0.77}$, the 20 nm-thick protective layer 11 formed of AlN and the overcoat layer 12 in this order on the substrate 9.

In the same manner as in Example 5, the CNR of the magneto-optical disk of this example was measured for a mark length of 0.3 μm. As a result, it was confirmed that the CNR of this example was 42.5 dB at a reproducing power of 2.4 mW, while the CNR of Example 5 was 42 dB at a reproducing power of 2.0 mW, and thus better super resolution reproducing characteristics were obtained in this example than in Example 5. Moreover, in this example, a wide reproducing power margin was obtained as in Example 5.

In this example, as the non-magnetic intermediate layer 13 formed of a transparent dielectric material, it is possible to use non-magnetic dielectric materials, such as AlN, SiN, AlSiN and $Ta_2O_3$. Besides, as the reflective layer 14, it is possible to use non-magnetic metals, such as Al, Ti, Ta, Pt, Au and Cu, or alloys of such non-magnetic metals.

Furthermore, in order to obtain a satisfactory interference effect, it is desirable that the film thickness of the transparent dielectric layer 10 is within a range of from 40 nm to 100 nm and the total film thickness of the reproducing magnetic layer 1, first in-plane magnetization layer 6 and second in-plane magnetization layer 7 is not more than 50 nm like Example 5. If the total film thickness is more than 50 nm, since the amount of light passed through the reproducing magnetic layer 1 is reduced, it is difficult to increase the Kerr rotation angle by the interference effect.

Additionally, in order to increase the Kerr rotation angle efficiently, it is desirable that the film thickness of the non-magnetic intermediate layer 13 formed of a transparent dielectric material is within a range of from 5 nm to 30 nm.

Furthermore, in order to perfectly intercept the reproduction of a signal from the recording magnetic layer 3 by the reflective layer 14 and reproduce only the information copied to the reproducing magnetic layer 1, the reflective layer 14 needs to have a film thickness of at least 5 nm or more.

In addition, it is desirable that the total film thickness of the first in-plane magnetization layer 6, the second in-plane magnetization layer 7, the non-magnetic intermediate layer 13 formed of a transparent dielectric material and the reflective layer 14 is not more than 60 nm. If the total film thickness is more than 60 nm, since the distance between the reproducing magnetic layer 1 and the recording magnetic layer 3 is too large, the magnetostatic coupling forces therebetween are weaker and stable reproduction can not be carried out.

This example illustrates the use of GdTbFeCo as the reproducing magnetic layer 1. However, even when GdDyFeCo is used as the reproducing magnetic layer 1, the same reproducing characteristics as in this example can be obtained.

EXAMPLE 10

Still another example of the present invention will be explained below.

In this example, the composition of the GdTbFeCo reproducing magnetic layer 1 in the structure of the magneto-optical disk of Example 3 was changed, and the magnetic properties and the recording and reproducing characteristics of the reproducing magnetic layer 1 were inspected.

In this example, the reproducing magnetic layer 1 has the composition $(Gd_{1-X}Tb_X)_Z(Fe_{1-Y}Co_Y)_{1-Z}$ The Curie temperature of this reproducing magnetic layer 1, and the CNR obtained by performing recording and reproduction in the same manner as in Example 3 are shown in Tables 1 and 2 below.

TABLE 1

| No. | X | Y | Z | T (° C.) | CNR (2.0) | CNR (2.5) | Ms (emu/cc) |
|---|---|---|---|---|---|---|---|
| 1-0 | 0.000 | 0.30 | 0.30 | 320 | 38.0 dB | 33.0 dB | 105 |
| 1-1 | 0.005 | 0.60 | 0.29 | 360 | 37.5 dB | 33.5 dB | 109 |
| 1-2 | 0.010 | 0.60 | 0.31 | 360 | 39.0 dB | 38.0 dB | 126 |
| 1-3 | 0.030 | 0.60 | 0.33 | 360 | 41.0 dB | 41.0 dB | 158 |
| 1-4 | 0.070 | 0.60 | 0.34 | 350 | 41.0 dB | 40.5 dB | 194 |
| 1-5 | 0.100 | 0.60 | 0.36 | 340 | 41.0 dB | 41.0 dB | 222 |
| 1-6 | 0.150 | 0.60 | 0.38 | 320 | 40.0 dB | 39.5 dB | 225 |
| 1-7 | 0.200 | 0.60 | 0.41 | 295 | 38.5 dB | 38.5 dB | 178 |
| 1-8 | 0.240 | 0.60 | 0.43 | 295 | 33.0 dB | 33.0 dB | 115 |

TABLE 2

| No. | X | Y | Z | T (° C.) | CNR (2.0) | CNR (2.5) |
|---|---|---|---|---|---|---|
| 2-0 | 0.000 | 0.30 | 0.30 | 320 | 38.0 dB | 33.0 dB |
| 2-1 | 0.100 | 0.25 | 0.43 | 260 | 37.0 dB | 36.5 dB |
| 2-2 | 0.100 | 0.30 | 0.41 | 305 | 38.5 dB | 37.0 dB |
| 2-3 | 0.100 | 0.40 | 0.39 | 315 | 40.5 dB | 40.0 dB |
| 2-4 | 0.100 | 0.50 | 0.38 | 320 | 41.0 dB | 41.5 dB |
| 2-5 | 0.100 | 0.60 | 0.36 | 340 | 41.0 dB | 41.0 dB |
| 2-6 | 0.100 | 0.80 | 0.35 | 350 | 41.5 dB | 41.0 dB |
| 2-7 | 0.100 | 1.00 | 0.33 | 360 | 41.0 dB | 41.0 dB |

In Tables 1 and 2, X, Y and Z indicate the composition of the reproducing magnetic layer 1. Tc shows the Curie temperature of the reproducing magnetic layer 1, CNR(2.0) and CNR(2.5) indicate the CNR at a reproducing power of 2.0 mW and the CNR at a reproducing power of 2.5 mW, respectively. Ms shows the total magnetization Ms at a temperature at which the perpendicular magnetic anisotropy constant Ku and the diamagnetic field energy $2\pi Ms^2$ are equal to each other. Moreover, the magneto-optical disk (1-0) and the magneto-optical disk (2-0) show the results obtained when GdFeCo shown in Comparative Example 3 was used as the reproducing magnetic layer 1. Furthermore, the value of Z in Tables 1 and 2 was determined by adjusting the composition so that a temperature at which the reproducing magnetic layer 1 showed a transition from an in-plane magnetization state to a perpendicular magnetization state was around 110° C.

Here, Table 1 will be explained first. Table 1 shows the results when the value of X was changed. In the magneto-optical disk (1-1) in which X=0.005, since the Tb content is too small, the objective of increasing the perpendicular magnetic anisotropy constant Ku of the reproducing magnetic layer 1 was not achieved, and only a CNR similar to the magneto-optical disk (1-0) was obtained.

In the magneto-optical disk (1-2) in which X=0.010, the perpendicular magnetic anisotropy constant Ku of the reproducing magnetic layer 1 is increased by an increase of the Tb content, and magnetostatic coupling forces between the reproducing magnetic layer 1 and the recording magnetic layer 3 are strengthen by an increase of the total magnetization Ms of the reproducing magnetic layer 1. As a result, copying and reproduction can be performed in a stable manner, and a higher CNR(2.0) than that of the magneto-optical disk (1-0) can be obtained. In particular, since the CNR(2.5) of the magneto-optical disk (1-2) is much higher than that of the magneto-optical disk (1-0), it will be understood that the reproducing power margin is increased.

In addition, it will be understood that, when the Tb content is increased, the magneto-optical disks up to (1-7) in which X=0.200 achieve higher CNR(2.0) and CNR(2.5) compared with the magneto-optical disk (1-0).

Moreover, the CNR(2.0) of the magneto-optical disk (1-8) in which the Tb content was increased and X=0.240 was much lower than the CNR(2.0) of the magneto-optical disk (1-0). The reason for this is that the perpendicular magnetic anisotropy constant Ku of the reproducing magnetic layer 1 became too large by the increase of the Tb content, and a stable in-plane magnetization state could not be produced in the reproducing magnetic layer 1.

It will be found from Table 1 that it is desirable for the reproducing magnetic layer 1 formed of $(Gd_{1-X}Tb_X)_Z(Fe_{1-Y}Co_Y)_{1-Z}$ to satisfy $0.01 \leq X \leq 0.20$ and $0.315 \leq Z \leq 0.41$. These ranges correspond to a range within which the total magnetization Ms at a temperature at which the perpendicular magnetic anisotropy constant Ku and the diamagnetic energy $2\pi Ms^2$ are equal to each other is not less than 126 emu/cc (not more than 225 emu/cc in Table 1).

Next, Table 2 will be explained. Table 2 shows the results when the value of Y was changed. In the magneto-optical disk (2-1) in which Y=0.25, the Co content was too small and the content (Z) of the rare-earth metal was increased. Consequently, since the Curie temperature of the reproducing magnetic layer 1 was very low and the polar Kerr rotation angle of the reproducing magnetic layer 1 was smaller, the intensity of the reproduced signal was lowered and only a CNR(2.0) lower than that of the magneto-optical disk (2-0) was obtained.

In the magneto-optical disk (2-2) in which Y=0.30, since the Co content is increased, the Curie temperature of the reproducing magnetic layer 1 becomes higher and the polar Kerr rotation angle thereof becomes larger, and thus the intensity of the reproduced signal is not lowered. At the same time, since Tb is contained, the perpendicular magnetic anisotropy constant Ku is increased and the total magnetization Ms of the reproducing magnetic layer 1 becomes larger, and therefore magnetostatic coupling forces between the reproducing magnetic layer 1 and the recording magnetic layer 3 are strengthen and copying and reproduction can be performed in a stable manner. For the above-mentioned reason, the CNR(2.0) of the magneto-optical disk (2-2) is higher than that of the magneto-optical disk (2-0). In particular, since the CNR(2.5) of the magneto-optical disk (2-2) is much higher than that of the magneto-optical disk (2-0), it will be found that the reproducing power margin is increased.

In addition, it will be found that, when the Co content is increased, the Curie temperature of the reproducing magnetic layer 1 is raised with an increase in the Co content and satisfactory CNR(2.0) and CNR(2.5) are obtained even by the magneto-optical disk (2-7) in which Y=1.00.

It will be found from the results shown in Table 2 that it is desirable for the reproducing magnetic layer 1 formed of $(Gd_{1-X}Tb_X)_Z(Fe_{1-Y}Co_Y)_{1-Z}$ to satisfy $0.30 \leq Y \leq 1.00$.

EXAMPLE 11

Referring to the drawings, still another example of the present invention will be explained below.

In this example, the composition of the reproducing magnetic layer 1 formed of GdDyFeCo in the structure of the magneto-optical disk of Example 4 was changed, and the magnetic properties and the recording and reproducing characteristics of the reproducing magnetic layer 1 were inspected. More specifically, the $(Gd_{1-X}Dy_X)_Z(Fe_{1-Y}Co_Y)_{1-Z}$ reproducing magnetic layer 1 was formed, and the Curie temperature of the reproducing magnetic layer 1 and the CNR were measured by performing recording and reproduction in the same manner as in Example 3. The results of measurements are shown in Tables 3 and 4.

TABLE 3

| No. | X | Y | Z | T (° C.) | CNR (2.0) | CNR (2.5) | Ms (emu/cc) |
|---|---|---|---|---|---|---|---|
| 3-0 | 0.00 | 0.30 | 0.30 | 320 | 38.0 dB | 33.0 dB | 105 |
| 3-1 | 0.01 | 0.50 | 0.28 | 340 | 37.5 dB | 33.5 dB | 110 |
| 3-2 | 0.02 | 0.50 | 0.29 | 340 | 38.5 dB | 37.0 dB | 125 |
| 3-3 | 0.08 | 0.50 | 0.31 | 330 | 40.5 dB | 40.0 dB | 173 |
| 3-4 | 0.16 | 0.50 | 0.33 | 320 | 41.0 dB | 40.5 dB | 195 |
| 3-5 | 0.20 | 0.50 | 0.35 | 315 | 40.0 dB | 39.5 dB | 203 |
| 3-6 | 0.28 | 0.50 | 0.37 | 305 | 39.0 dB | 39.0 dB | 193 |
| 3-7 | 0.35 | 0.50 | 0.40 | 280 | 38.5 dB | 38.5 dB | 151 |
| 3-8 | 0.40 | 0.50 | 0.43 | 260 | 33.0 dB | 33.0 dB | 120 |

TABLE 4

| No. | X | Y | Z | T (° C.) | CNR (2.0) | CNR (2.5) |
|---|---|---|---|---|---|---|
| 4-0 | 0.00 | 0.30 | 0.30 | 320 | 38.0 dB | 33.0 dB |
| 4-1 | 0.16 | 0.30 | 0.40 | 255 | 37.0 dB | 36.5 dB |
| 4-2 | 0.16 | 0.35 | 0.38 | 280 | 38.5 dB | 37.0 dB |
| 4-3 | 0.16 | 0.40 | 0.36 | 305 | 40.5 dB | 40.0 dB |
| 4-4 | 0.16 | 0.50 | 0.33 | 320 | 41.0 dB | 40.5 dB |
| 4-5 | 0.16 | 0.60 | 0.31 | 340 | 41.0 dB | 41.0 dB |
| 4-6 | 0.16 | 0.70 | 0.30 | 350 | 40.5 dB | 39.0 dB |
| 4-7 | 0.16 | 0.80 | 0.28 | 350 | 20.5 dB | 19.5 dB |

In Tables 3 and 4, X, Y and Z indicate the composition of the reproducing magnetic layer 1. Tc shows the Curie temperature of the reproducing magnetic layer 1, CNR(2.0) and CNR(2.5) indicate the CNR at a reproducing power of 2.0 mW and the CNR at a reproducing power of 2.5 mW, respectively. Moreover, the magneto-optical disk (3-0) and the magneto-optical disk (4-0) show the results obtained when GdFeCo shown in Comparative Example 3 was used as the reproducing magnetic layer 1. Furthermore, the value of Z in Tables 3 and 4 was determined by adjusting the composition so that a temperature at which the reproducing magnetic layer 1 showed a transition from an in-plane magnetization state to a perpendicular magnetization state was around 110° C.

First, the results of measurement shown in Table 3 will be explained. Table 3 shows the results when the value of X was changed. In the magneto-optical disk (3-1) in which X=0.01, since the Dy content was too small, the objective of increasing the perpendicular magnetic anisotropy constant Ku of the reproducing magnetic layer 1 was not achieved and only a CNR similar to that of the magneto-optical disk (3-0) was obtained.

In the magneto-optical disk (3-2) in which X=0.02, the perpendicular magnetic anisotropy constant Ku of the reproducing magnetic layer 1 is increased by the increase of the Dy content and magnetostatic coupling forces between the reproducing magnetic layer 1 and the recording magnetic layer 3 are strengthen by the increase of the total magnetization Ms of the reproducing magnetic layer 1, and therefore copying and reproduction can be performed in a stable manner and a higher CNR(2.0) than that of the magneto-optical disk (3-0) is obtained. In particular, since the CNR (2.5) of the magneto-optical disk (3-2) is much higher than that of the magneto-optical disk (3-0), it will be found that the reproducing power margin is increased.

In addition, it will be understood that, when the Dy content is increased, the magneto-optical disks up to (3-7) in which X=0.35 achieve higher CNR(2.0) and CNR(2.5) than the magneto-optical disk (3.0).

Moreover, the CNR(2.0) of the magneto-optical disk (3-8) in which the Dy content was increased and X=0.40 was much lower than the CNR(2.0) of the magneto-optical disk (3-0). The reason for this is that the perpendicular magnetic anisotropy constant Ku of the reproducing magnetic layer 1 became too large by the increase of the Dy content, and a stable in-plane magnetization state could not be produced in the reproducing magnetic layer 1.

It will be found from Table 3 that it is desirable for the reproducing magnetic layer 1 formed of $(Gd_{1-X}Dy_X)_Z(Fe_{1-Y}Co_Y)_{1-Z}$ to satisfy $0.02 \leq X \leq 35$ and $0.29 \leq Z \leq 0.40$. These ranges correspond to a range within which the total magnetization Ms at a temperature at which the perpendicular magnetic anisotropy constant Ku and the diamagnetic energy $2\pi Ms^2$ are equal to each other is not less than 125 emu/cc (not more than 203 emu/cc in Table 3).

Next, Table 4 will be explained. In the magneto-optical disk (4-1) in which Y=0.30, the Co content is too small and the content (Z) of the rare-earth metal is increased. For this reason, since the Curie temperature of the reproducing magnetic layer 1 was very low and the polar Kerr rotation angle of the reproducing magnetic layer 1 was small, the intensity of the reproduced signal was lowered and only a CNR(2.0) lower than that of the magneto-optical disk (4-0) was obtained.

In the magneto-optical disk (4-2) in which Y=0.35, since the Co content is increased, the Curie temperature of the reproducing magnetic layer 1 becomes higher and the polar Kerr rotation angle thereof becomes larger, and thus the intensity of the reproduced signal is not lowered. At the same time, the perpendicular magnetic anisotropy constant Ku is increased as Dy is contained and magnetostatic coupling forces between the reproducing magnetic layer 1 and the recording magnetic layer 3 are strengthen as the total magnetization Ms of the reproducing magnetic layer 1 is increased, thereby enabling stable copying and reproduction. For the above-mentioned reason, the CNR(2.0) of the magneto-optical disk (4-2) is higher than that of the magneto-optical disk (4-0). In particular, since the CNR(2.5) of the magneto-optical disk (4-2) is much higher than that of the magneto-optical disk (4-0), it will be understood that the reproducing power margin is increased.

In addition, it will be found that, when the Co content is increased, the Curie temperature of the reproducing magnetic layer 1 is raised with an increase in the Co content and satisfactory CNR(2.0) and CNR(2.5) are obtained even by the magneto-optical disk (4-6) in which Y=0.70. However, in the magneto-optical disk (4-7) in which the Co content was further increased to Y=0.80, the reproducing magnetic layer 1 could not be made a perpendicular magnetization state and only a very low CNR was obtained.

It will be found from the results shown in Table 4 that it is desirable for the reproducing magnetic layer 1 formed of $(Gd_{1-X}Dy_X)_Z(Fe_{1-Y}Co_Y)_{1-Z}$ to satisfy $0.35 \leq Y \leq 70$.

It can be said from Examples 10 and 11 that it is desirable to satisfy $$0.01 \leq X \leq 0.20,$$

$$0.30 \leq Y \leq 1.00,$$

$$0.31 \leq Z \leq 0.41$$

for $(Gd_{1-X}Tb_X)_Z(Fe_{1-Y}Co_Y)_{1-Z}$, and $$0.02 \leq X \leq 0.35,$$

$$0.35 \leq Y \leq 0.70,$$

$$0.29 \leq Z \leq 0.40$$

for $(Gd_{1-X}Dy_X)_Z(Fe_{1-Y}Co_Y)_{1-Z}$.

Moreover, it can be said from the above-mentioned results that the total magnetization Ms at a temperature at which the perpendicular magnetic anisotropy constant Ku and the diamagnetic field energy $2\pi Ms^2$ are equal to each other is preferably around 126 emu/CC or more.

In Examples 10 and 11, the applicable ranges of compositions of GdTbFeCo and GdDyFeCo to the magneto-optical disk shown in FIG. 11 of Examples 3 and 4 were determined. However, it is also possible to use GdTbFeCo and GdDyFeCo within the same ranges of compositions for the magneto-optical disks which have the structures shown in FIGS. 8, 14, 17, 18 and 19, and achieve super resolution reproduction according to the same theory of reproduction.

EXAMPLE 12

Referring to the drawings, still another example of the present invention will be explained below.

This example illustrates a magneto-optical disk whose polar Kerr rotation angle in a short wavelength range is increased by containing Nd.

Table 5 shows the results of inspecting the reproducing magnetic layers 1 formed of GdFeCo, GdFeCoNd, GdTbFeCoNd, GdDyFeCoNd and GdTbCoNd, respectively, for the temperature Tp at which a transition from an in-plane magnetization state to a perpendicular magnetization state occurs, the Curie temperature Tc, the polar Kerr rotation angle θk(680) at a wavelength of 680 nm and a measuring temperature of 120° C., and the polar Kerr rotation angle θk(400) at a wavelength of 400 nm and a measuring temperature of 120° C. Here, θk(680) and θk(400) indicate the polar Kerr rotation angles when a magnetic field was applied at room temperature to saturate the magnetization of the reproducing magnetic layer 1 to a perpendicular magnetization state.

TABLE 5

|  | Tp (° C.) | Tc (° C.) | θk (680) | θk (400) |
|---|---|---|---|---|
| $Gd_{0.30}(Fe_{0.70}Co_{0.30})_{0.70}$ | 110 | 320 | 0.39° | 0.31° |
| $Gd_{0.30}(Fe_{0.70}Co_{0.30})_{0.50}Nd_{0.20}$ | 120 | 200 | 0.30° | 0.28° |
| $Gd_{0.30}(Fe_{0.40}Co_{0.60})_{0.50}Nd_{0.20}$ | — | 340 | 0.42° | 0.40° |
| $(Gd_{0.80}Tb_{0.20})_{0.30}(Fe_{0.40}Co_{0.60})_{0.50}Nd_{0.20}$ | 110 | 320 | 0.41° | 0.38° |
| $(Gd_{0.72}Tb_{0.28})_{0.30}(Fe_{0.40}Co_{0.60})_{0.50}Nd_{0.20}$ | 110 | 300 | 0.39° | 0.37° |
| $(Gd_{0.72}Tb_{0.28})_{0.30}Co_{0.50}Nd_{0.20}$ | 110 | 300 | 0.40° | 0.37° |

The reproducing magnetic layer formed of $Gd_{0.30}(Fe_{0.70}Co_{0.30})_{0.70}$ showed a transition from an in-plane magnetization state to a perpendicular magnetization state at 110° C., and had its Curie temperature at 320 C.° and a polar Kerr rotation angle θk(680) of 0.39° at a measuring wavelength of 680 nm. However, when the measuring wavelength was decreased to 400 nm, the polar Kerr rotation angle θk(400) was 0.31° and thus the Kerr rotation angle decreased to a great extent by the decrease of the wavelength.

Next, in the reproducing magnetic layer formed of $Gd_{0.30}(Fe_{0.70}Co_{0.30})_{0.50}Nd_{0.20}$ by adding Nd to GdFeCo, like the above-mentioned GdFeCo, a transition from an in-plane magnetization state to a perpendicular magnetization state occurred at 120 C.°. However, the Curie temperature Tc was considerably lowered to 200 C.° because of the addition of Nd. Consequently, θk(680) was 0.30° and θk(400) was 0.28°. Thus, when the reproducing magnetic layer was formed of $Gd_{0.30}(Fe_{0.70}Co_{0.30})_{0.50}Nd_{0.20}$, since the decrease of the Kerr rotation angle due to a reduction of the wavelength was limited, the decrease of the polar Kerr rotation angle due to the lowering of the Curie temperature was notable, causing a lowering of the intensity of the reproduced signal.

Next, $Gd_{0.30}(Fe_{0.40}Co_{0.60})_{0.50}Nd_{0.20}$ is a reproducing magnetic layer that achieves higher ek(680) and ek(400) by increasing the Co content of GdTbFeCoNd to increase the Curie temperature. θk(680) and θk(400) of this reproducing magnetic layer indicate the polar Kerr rotation angle when the magnetization was saturated in a direction perpendicular to the plane of the film by the application of a magnetic field. In the case of $Gd_{0.30}(Fe_{0.40}Co_{0.60})_{0.50}Nd_{0.20}$, θk(680) was 0.42°, θk(400) was 0.40°, the reduction of the Kerr rotation angle due to a decrease of the wavelength was limited and the Curie temperature was increased to 340° C., thereby achieving a large poler Kerr rotation angle.

However, since the increase in the amount of Cd added causes an increase of the magnetization and a decrease of the perpendicular magnetic anisotropy constant, an in-plane magnetization state is shown at any temperature range, but a perpendicular magnetization state can not be realized. It is therefore impossible to achieve super resolution reproduction of the present invention which is realized by a transition from an in-plane magnetization state to a perpendicular magnetization state with an increase in temperature.

In this example, even when the perpendicular magnetization anisotropy constant is increased by containing Tb or Dy in $Gd_{0.30}(Fe_{0.40}Co_{0.60})_{0.50}Nd_{0.20}$ and the Curie temperature is increased by increasing the amount of Co added, it is possible to cause a transition from an in-plane magnetization state to a perpendicular magnetization state and achieve super resolution reproduction of the present invention.

In the case of $(Gd_{0.80}Tb_{0.20})_{0.30}(Fe_{0.40}Co_{0.60},0.50)_{0.20}$, the temperature Tp at which a transition from an in-plane magnetization state to a perpendicular magnetization state occurred was 110° C., the Curie temperature was 320° C., and a transition from an in-plane magnetization state to a perpendicular magnetization state was realized, thereby enabling super resolution reproduction of the present invention. Moreover, θk(680) was 0.41°, θk(400) was 0.38°, the reduction of the Kerr rotation angle due to a decrease of the wavelength was limited, and a large poler Kerr rotation angle resulting from the high Curie temperature was obtained.

Furthermore, in the case of $(Gd_{0.72}Tb_{0.28})_{0.30}$ $(Fe_{0.40}Co_{0.60})_{0.5}Nd_{0.20}$ the temperature Tp at which a transition from an in-plane magnetization state to a perpendicular magnetization state occurred was 110° C., the Curie temperature was 300° C., and a transition from an in-plane magnetization state to a perpendicular magnetization state was realized, thereby enabling super resolution reproduction of the present invention. Moreover, θk(680) was 0.39°, θk(400) was 0.37°, the reduction of the Kerr rotation angle due to a decrease of the wavelength was limited, and a large poler Kerr rotation angle resulting from the high Curie temperature was obtained.

Besides, in the case of $(Gd_{0.72}Tb_{0.28})_{0.30}Co_{0.50}Nd_{0.20}$, the temperature Tp at which a transition from an in-plane magnetization state to a perpendicular magnetization state occurred was 110 0C, the Curie temperature was 300°C., and a transition from an in-plane magnetization state to a perpendicular magnetization state was realized, thereby enabling super resolution reproduction of the present invention. Moreover, θk(680) was 0.40°, θk(400) was 0.37°, the reduction of the Kerr rotation angle due to a decrease of the wavelength was limited, and a large poler Kerr rotation angle resulting from the high Curie temperature was obtained.

The preferred embodiments of a magneto-optical recording medium of the present invention are explained in Embodiments 1 through 4 and Examples 1 through 12. However, the spirit of the present invention is not limited to the above-described structures, and various modifications can be made.

Embodiments 1 through 4 and Examples 1 through 12 illustrate magneto-optical disks using the reproducing magnetic layer 1 formed by containing Tb or Dy in GdFeCo or the reproducing magnetic layer 1 formed of GdTbCo. However, it is possible to use any reproducing magnetic layer if it can improve the total magnetization Ms at a temperature at which the perpendicular magnetic anisotropy constant Ku and the diamagnetic field energy $2\pi Ms^2$ are equal to each other by containing an element as mentioned above, in comparison with a reproducing magnetic layer consisting only of Gd, Fe and Co having substantially the same temperature. Therefore, according to this spirit, it is possible to use a reproducing magnetic layer formed by containing both of Tb and Dy, or a light rare-earth metal such as Pr in Gd, Fe and Co (or Gd and Co).

As described above, according to the structure of the present invention, magnetostatic coupling forces between the reproducing magnetic layer and the recording magnetic layer are strengthen, a smaller recorded magnetic domain can be copied to the reproducing magnetic layer and reproduced in a stable manner, and the reproducing margin can be increased.

Moreover, it is possible to raise the Curie temperature of the reproducing magnetic layer and increase the Kerr rotation angle thereof to improve the quality of reproduced signals.

As described above, a first magneto-optical recording medium of the present invention is a magneto-optical recording medium including at least: a reproducing magnetic layer composed of Gd, Fe and Co showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and characterized by containing either Tb or Dy in the reproducing magnetic layer so as to increase the total magnetization at a temperature at which a perpendicular magnetic anisotropy constant and a diamagnetic field energy are equal to each other.

According to this structure, since either a rare-earth metal Tb or Dy capable of increasing the perpendicular magnetic anisotropy constant Ku is contained in the reproducing magnetic layer, it is possible to obtain a greater perpendicular magnetic anisotropy constant Ku compared with GdFeCo. Therefore, even when the total magnetization Ms within a temperature range within which the reproducing magnetic layer shows a perpendicular magnetization state is relatively large, it is possible to bring the reproducing magnetic layer into the perpendicular magnetization state.

Thus, during the copying and reproduction of the magnetization information of the recording magnetic layer onto the reproducing magnetic layer by magnetostatic coupling, the total magnetization Ms of the reproducing magnetic layer in a temperature region where the reproducing magnetic layer shows the perpendicular magnetization state with an increase of temperature is sufficiently large, and magnetostatic coupling forces between the reproducing magnetic layer and the recording magnetic layer are sufficiently strong. As a result, the magnetization information of the recording magnetic layer can be copied to the reproducing magnetic layer in a stable manner. Moreover, even when the temperature of the reproducing magnetic layer is further raised with an increase of the reproducing power, since the decrease of the total magnetization of the reproducing magnetic layer is relatively small, it is possible to obtain magnetostatic coupling forces necessary for copying and reproduction, and a wide reproducing power margin.

A second magneto-optical recording medium of the present invention is a magneto-optical recording medium including at least: a reproducing magnetic layer showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and characterized in that the reproducing magnetic layer is formed of $(Gd_{1-X}Tb_X)_Z(Fe_{1-Y}Co_Y)_{1-Z}$ and satisfies $0.01 \leq X \leq 0.20$, $0.30 \leq Y \leq 1.00$, and $0.31 \leq Z \leq 0.41$.

With this structure, it is possible to provide the same effects as the above-mentioned first magneto-optical recording medium.

A third magneto-optical recording medium of the present invention is a magneto-optical recording medium including at least: a reproducing magnetic layer showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and characterized in that the reproducing magnetic layer is formed of $(Gd_{1-X}Dy_X)_Z(Fe_{1-Y}Co_Y)_{1-Z}$ and satisfies $0.02 \leq X \leq 0.35$, $0.35 \leq Y \leq 0.70$, and $0.29 \leq Z \leq 0.40$.

With this structure, it is possible to provide the same effects as the above-mentioned first magneto-optical recording medium.

A fourth magneto-optical recording medium of the present invention is a magneto-optical recording medium including at least: a reproducing magnetic layer showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and characterized in that the reproducing magnetic layer is formed of either GdTbFeCo, GdTbCo, or GdDyFeCo, and the total magnetization at a temperature at which the perpendicular magnetic anisotropy constant and the diamagnetic energy are equal to each other is not less than 126 emu/cc.

With this structure, it is possible to provide the same effects as the above-mentioned first magneto-optical recording medium.

A fifth magneto-optical recording medium of the present invention is a magneto-optical recording medium including at least: a reproducing magnetic layer showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and characterized in that the reproducing magnetic layer is formed of either GdTbFeCoNd, GdTbCoNd, or GdDyFeCoNd.

When Nd is added to the reproducing magnetic layer formed of GdFeCo, the polar Kerr rotation angle in a short wavelength region is increased and the quality of reproduced signals is improved. However, if the amount of Nd added is increased, the Curie temperature is lowered and the polar Kerr rotation angle becomes substantially smaller.

Moreover, in such a magneto-optical recording medium in which the reproducing magnetic layer and the recording magnetic layer are exchange coupled, even if the reproducing magnetic layer has a small perpendicular magnetic anisotropy constant Ku and is not made a perfect perpendicular magnetization film, it is possible to bring the reproducing magnetic layer into a perpendicular magnetization state by exchange coupling with the recording magnetic layer and compensate for a lowering of the Curie temperature due to the addition of Nd by relatively increasing the Co content of GdTbNdFeCo having a relatively small perpendicular magnetic anisotropy constant Ku.

However, in a magneto-optical recording medium in which the reproducing magnetic layer and the recording magnetic layer are magneto-statically coupled like the present invention, when the perpendicular magnetic anisotropy constant Ku of the reproducing magnetic layer becomes smaller, it is impossible to achieve such a characteristic that a transition from an in-plane magnetization state to a perpendicular magnetization state occurs with an increase in temperature. Thus, in a magneto-optical recording medium in which the reproducing magnetic layer and the recording magnetic layer are magneto-statically coupled like the present invention, when the lowering of Curie temperature due to the addition of Nd is compensated by relatively increasing the Co content of GdTbFeCo having a relatively small perpendicular magnetic anisotropy constant Ku, it is difficult to bring the reproducing magnetic layer into a perpendicular magnetization state.

Hence, like the above-mentioned structure, GdTbFeCoNd, GdDyFeCoNd or GdTbCoNd containing a rare-earth metal consisting of Tb or Dy capable of increasing the perpendicular magnetic anisotropy constant Ku is used to sufficiently increase the perpendicular magnetic anisotropy constant, and the Co content is relatively increased to compensate for the lowering of the Curie temperature due to the addition of Nd and increase the polar Kerr rotation angle in the short wavelength region, thereby improving the quality of reproduced signals.

A sixth magneto-optical recording medium of the present invention is a magneto-optical recording medium including at least: a reproducing magnetic layer composed of Gd, Fe, Co and Nd showing an in-plane magnetization state at room temperature and a transition to a perpendicular magnetization state at temperatures of not lower than a critical temperature; and a recording magnetic layer formed of a perpendicular magnetization film, the reproducing magnetic layer and the recording magnetic layer being magneto-statically coupled at least in the vicinity of the critical temperature, and characterized by containing either Tb or Dy in the reproducing magnetic layer so as to increase the Curie temperature.

With this structure, it is possible to provide the same effects as the above-mentioned fifth magneto-optical recording medium.

A seventh magneto-optical recording medium of the present invention has the structure of any one of the above-mentioned first through sixth magneto-optical recording medium, and is characterized by including a non-magnetic intermediate layer between the recording magnetic layer and the reproducing magnetic layer.

With this structure, it is possible to achieve more stable magnetostatic coupling between the recording magnetic layer and the reproducing magnetic layer in addition to the effects of the first magneto-optical recording medium.

An eighth magneto-optical recording medium of the present invention has the structure of any one of the above-mentioned first through seventh magneto-optical recording medium, and is characterized by including between the recording magnetic layer and the reproducing magnetic layer a non-magnetic intermediate layer whose Curie temperature is not higher than the vicinity of the critical temperature.

A ninth magneto-optical recording medium of the present invention has the structure of any one of the above-mentioned first through seventh magneto-optical recording medium, and is characterized by including between the recording magnetic layer and the reproducing magnetic layer an in-plane magnetization layer whose Curie temperature is not higher than the vicinity of the critical temperature.

With this structure, a more abrupt transition from an in-plane magnetization to a perpendicular magnetization state occurs in the reproducing magnetic layer, thereby improving the reproduction resolution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising at least a reproducing magnetic layer composed at least of Gd and Co showing an in-plane magnetization state at room temperature and a transition to a perpendicular magnetization state at temperatures of not lower than a critical temperature, and a recording magnetic layer formed of a perpendicular magnetization film, said reproducing magnetic layer and said recording magnetic layer being magneto-statically coupled at least in the vicinity of said critical temperature, said reproducing magnetic layer containing at least both of Tb and Dy so as to increase a total magnetization at a temperature at which a perpendicular magnetic anisotropy constant and a diamagnetic field energy are equal to each other, and a non-magnetic intermediate layer provided between the reproducing magnetic layer and the recording magnetic layer, for cutting off the exchange-coupling of the reproducing magnetic layer and the recording magnetic layer, and coupling the reproducing magnetic layer and the recording magnetic layer magneto-statically.

2. A magneto-optical recording medium comprising at least a reproducing magnetic layer composed at least of Gd and Co showing an in-plane magnetization state at room temperature and a transition to a perpendicular magnetization state at temperatures of not lower than a critical temperature, and a recording magnetic layer formed of a perpendicular magnetization film, said reproducing magnetic layer and said recording magnetic layer being magneto-statically coupled at least in the vicinity of said critical temperature, said reproducing magnetic layer containing at least Tb so as to increase a total magnetization at a temperature at which a perpendicular magnetic anisotropy constant and a diamagnetic field energy are equal to each other, wherein said reproducing magnetic layer is formed of GdTbFeCoNd and a non-magnetic intermediate layer provided between the reproducing magnetic layer and the recording magnetic layer, for cutting off the exchange-coupling of the reproducing magnetic layer and the recording magnetic layer, and coupling the reproducing magnetic layer and the recording magnetic layer magneto-statically.

3. A magneto-optical recording medium comprising at least a reproducing magnetic layer composed at least of Gd and Co showing an in-plane magnetization state at room temperature and a transition to a perpendicular magnetization state at temperatures of not lower than a critical temperature, and a recording magnetic layer formed of a perpendicular magnetization film, said reproducing magnetic layer and said recording magnetic layer being magneto-statically coupled at least in the vicinity of said critical temperature, said reproducing magnetic layer containing at least Tb so as to increase a total magnetization at a temperature at which a perpendicular magnetic anisotropy constant and a diamagnetic field energy are equal to each other, wherein said reproducing magnetic layer is formed of GdTbCoNd, and a non-magnetic intermediate layer provided between the reproducing magnetic layer and the recording magnetic layer, for cutting off the exchange-coupling of the reproducing magnetic layer and the recording magnetic layer, and coupling the reproducing magnetic layer and the recording magnetic layer magneto-statically.

4. A magneto-optical recording medium comprising at least a reproducing magnetic layer composed at least of Gd and Co showing an in-plane magnetization state at room temperature and a transition to a perpendicular magnetization state at temperatures of not lower than a critical temperature, and a recording magnetic layer formed of a perpendicular magnetization film, said reproducing magnetic layer and said recording magnetic layer being magneto-statically coupled at least in the vicinity of said critical temperature, said reproducing magnetic layer containing at least Tb so as to increase a total magnetization at a temperature at which a perpendicular magnetic anisotropy constant and a diamagnetic field energy are equal to each other, wherein said reproducing magnetic layer is formed of GdTbFeCo, and a non-magnetic intermediate layer provided between the reproducing magnetic layer and the recording magnetic layer, for cutting off the exchange-coupling of the reproducing magnetic layer and the recording magnetic layer, and coupling the reproducing magnetic layer and the recording magnetic layer magneto-statically, wherein said reproducing magnetic layer is formed of $(Gd_{1-X}Tb_X)_z(Fe_{1-Y}Co_Y)_{1-z}$, and satisfies $0.01 \leq X \leq 0.20$, $0.30 \leq Y \leq 1.00$, and $0.31 \leq Z \leq 0.41$.

* * * * *